Feb. 27, 1951 W. T. POWELL 2,543,534

AUTOMATIC TELEPHONE SYSTEM

Filed Jan. 9, 1947 23 Sheets-Sheet 1

INVENTOR.
WINFRED T. POWELL

BY J. L. Bowes

ATTORNEY

Feb. 27, 1951 W. T. POWELL 2,543,534

AUTOMATIC TELEPHONE SYSTEM

Filed Jan. 9, 1947 23 Sheets-Sheet 2

INVENTOR.
WINFRED T. POWELL

BY T. L. Bowes

ATTORNEY

INVENTOR.
WINFRED T. POWELL
BY T. L. Bowes
ATTORNEY

INVENTOR.
WINFRED T. POWELL
BY
T. L. Bowes
ATTORNEY

Feb. 27, 1951 W. T. POWELL 2,543,534

AUTOMATIC TELEPHONE SYSTEM

Filed Jan. 9, 1947 23 Sheets-Sheet 5

INVENTOR.
WINFRED T. POWELL

BY J. L. Bowes

ATTORNEY

INVENTOR.
WINFRED T. POWELL
BY J. L. Bowes
ATTORNEY

Feb. 27, 1951 W. T. POWELL 2,543,534

AUTOMATIC TELEPHONE SYSTEM

Filed Jan. 9, 1947 23 Sheets-Sheet 7

INVENTOR.
WINFRED T. POWELL

BY T. L. Bowes

ATTORNEY

INVENTOR.
WINFRED T. POWELL
BY T. L. Bowes
ATTORNEY

Feb. 27, 1951 W. T. POWELL 2,543,534

AUTOMATIC TELEPHONE SYSTEM

Filed Jan. 9, 1947 23 Sheets-Sheet 9

INVENTOR.
WINFRED T. POWELL

BY T. L. Bowes

ATTORNEY

Feb. 27, 1951 W. T. POWELL 2,543,534

AUTOMATIC TELEPHONE SYSTEM

Filed Jan. 9, 1947 23 Sheets-Sheet 10

INVENTOR.
WINFRED T. POWELL

BY T. L. Bowes

ATTORNEY

INVENTOR.
WINFRED T. POWELL
BY T. L. Bowes
ATTORNEY

Feb. 27, 1951 W. T. POWELL 2,543,534

AUTOMATIC TELEPHONE SYSTEM

Filed Jan. 9, 1947 23 Sheets-Sheet 12

INVENTOR.
WINFRED T. POWELL

BY T. L. Bowes

ATTORNEY

INVENTOR.
WINFRED T. POWELL
BY J. L. Bowes
ATTORNEY

Feb. 27, 1951 W. T. POWELL 2,543,534

AUTOMATIC TELEPHONE SYSTEM

Filed Jan. 9, 1947 23 Sheets-Sheet 14

INVENTOR.
WINFRED T. POWELL

BY J. L. Bowes

ATTORNEY

INVENTOR.
WINFRED T. POWELL
BY J. L. Bowes
ATTORNEY

INVENTOR.
WINFRED T. POWELL
BY T. L. Bowes
ATTORNEY

INVENTOR.
WINFRED T. POWELL
BY T. L. Bowes
ATTORNEY

Feb. 27, 1951 W. T. POWELL 2,543,534

AUTOMATIC TELEPHONE SYSTEM

Filed Jan. 9, 1947 23 Sheets-Sheet 18

INVENTOR.
WINFRED T. POWELL
BY T. L. Bowes
ATTORNEY

Feb. 27, 1951 W. T. POWELL 2,543,534

AUTOMATIC TELEPHONE SYSTEM

Filed Jan. 9, 1947 23 Sheets-Sheet 19

INVENTOR.
WINFRED T. POWELL

BY T. L. Bowes

ATTORNEY

Feb. 27, 1951

W. T. POWELL 2,543,534

AUTOMATIC TELEPHONE SYSTEM

Filed Jan. 9, 1947

23 Sheets-Sheet 20

INVENTOR.
WINFRED T. POWELL

BY T. L. Bowes

ATTORNEY

INVENTOR.
WINFRED T. POWELL
BY T. L. Bowes
ATTORNEY

Feb. 27, 1951 W. T. POWELL 2,543,534

AUTOMATIC TELEPHONE SYSTEM

Filed Jan. 9, 1947 23 Sheets-Sheet 22

INVENTOR.
WINFRED T. POWELL

BY T. L. Bowes

ATTORNEY

Feb. 27, 1951

W. T. POWELL 2,543,534

AUTOMATIC TELEPHONE SYSTEM

Filed Jan. 9, 1947

23 Sheets-Sheet 23

INVENTOR.
WINFRED T. POWELL

BY J. L. Bowes

ATTORNEY

Patented Feb. 27, 1951

2,543,534

UNITED STATES PATENT OFFICE 2,543,534

AUTOMATIC TELEPHONE SYSTEM

Winfred T. Powell, Rochester, N. Y., assignor to Stromberg-Carlson Company, a corporation of New York Application January 9, 1947, Serial No. 721,051

26 Claims. (Cl. 179—18)

This invention relates to switching systems and it more particularly pertains to automatic telephone systems.

The principal objects of the present invention relate to the simplification of automatic telephone systems, to an increase in the reliability, to a reduction in the cost, to an increase in the speed of operation and in means for obtaining other improvements therein.

More specifically, the present switching system provides a novel method and novel means for performing the marking, testing, registering, selecting and connecting operations in an automatic telephone system by means of mechanical relays and electronic discharge devices.

One feature of the invention relates to a trunk grouping and trunk operating arrangement whereby the same relay type line finders have access to calling lines and to called lines, with discriminating means for causing the same line finder trunks to be connected to talking links over originating or outgoing paths for calling lines, or to these same talking links over terminating or incoming paths for called lines.

Another feature of the invention is a marking or testing system in which the several trunk groups to which a calling line has access are simultaneously tested by means of electronic tubes. If there is an available two-way trunk (see Fig. 1) and an available secondary outgoing trunk associated with an idle link to which the available two-way trunk has access (see Fig. 1A), then properly phased pulses are effectively applied to the proper tubes so that only one tube will fire at a given time (in the event that there is more than one trunk available) for effecting the proper relay operation for selecting and connecting with the proper trunk in the proper trunk group.

Other features and advantages of the invention will appear from the following detailed description, the exact nature of the invention being best understood from the description taken in conjunction with the attached drawings in which:

Figs. 1 and 1A, when placed together in the order named and with corresponding lines in alignment, illustrate a single wire diagram of the layout and trunking plan of the present invention.

Fig. 1B is a key diagram indicating the order in which the remaining figures, showing the circuit details, are placed in order to follow the detailed description of the operation of the system.

Fig. 1C indicates how the regular type and the gang type relays are indicated. For example, the three cross marks within the confines of the oblique lines associated with certain lines and trunks means that these cross marks represent contacts of a gang relay, all of which are closed when the relay operates. The single cross mark (not enclosed) indicates that only a single circuit is closed when the associated relay operates. For example, referring to the upper left hand portion of Fig. 1, when the #1 line finder gang or tens relay #1 and the # line finder small or units relay #1 are operated, the ten lines having tens digit 1 are connected to the ten horizontal wires associated with the lines of this group and the operation of the #1 units relay selects the line of the ten having units digit #1, for connecting line #11 of this group to the two-way trunk associated with this particular line finder.

In pointing out the disclosure in the following figures it will be understood that they are abbreviated showings, with only a sufficient portion illustrated to enable those skilled in the art to understand the invention.

For the purpose of simplifying the illustrations and facilitating the explanation, the various parts and circuits constituting the embodiment of the invention have been shown diagrammatically and certain conventional illustrations have been employed, the drawings having been made more with the purpose of making it easy to understand the principles and mode of operation, than with the idea of illustrating the specific construction and arrangement of parts that would be employed in practice.

Thus, the various relays and their contacts are illustrated in a conventional manner and symbols are used to indicate the connections to the terminals of batteries or other sources of electric current, instead of showing all of the wiring connections to these terminals. Plus (+) and minus (−) symbols are employed to indicate the positive and negative terminals, respectively, of suitable sources of direct current, instead of using the ground and battery symbols usually found in telephone circuits, it being understood that the positive terminal of the source of direct current used for operating the various relays is connected to ground. The source of direct current connected to certain vacuum tube circuits has its negative terminal connected to ground. The circuits operating in connection with this negatively grounded source use the conventional symbols, with the short line representing the negative (grounded) terminal and the long line representing the positive (ungrounded) side of the battery or other source of direct current.

Figure 2:
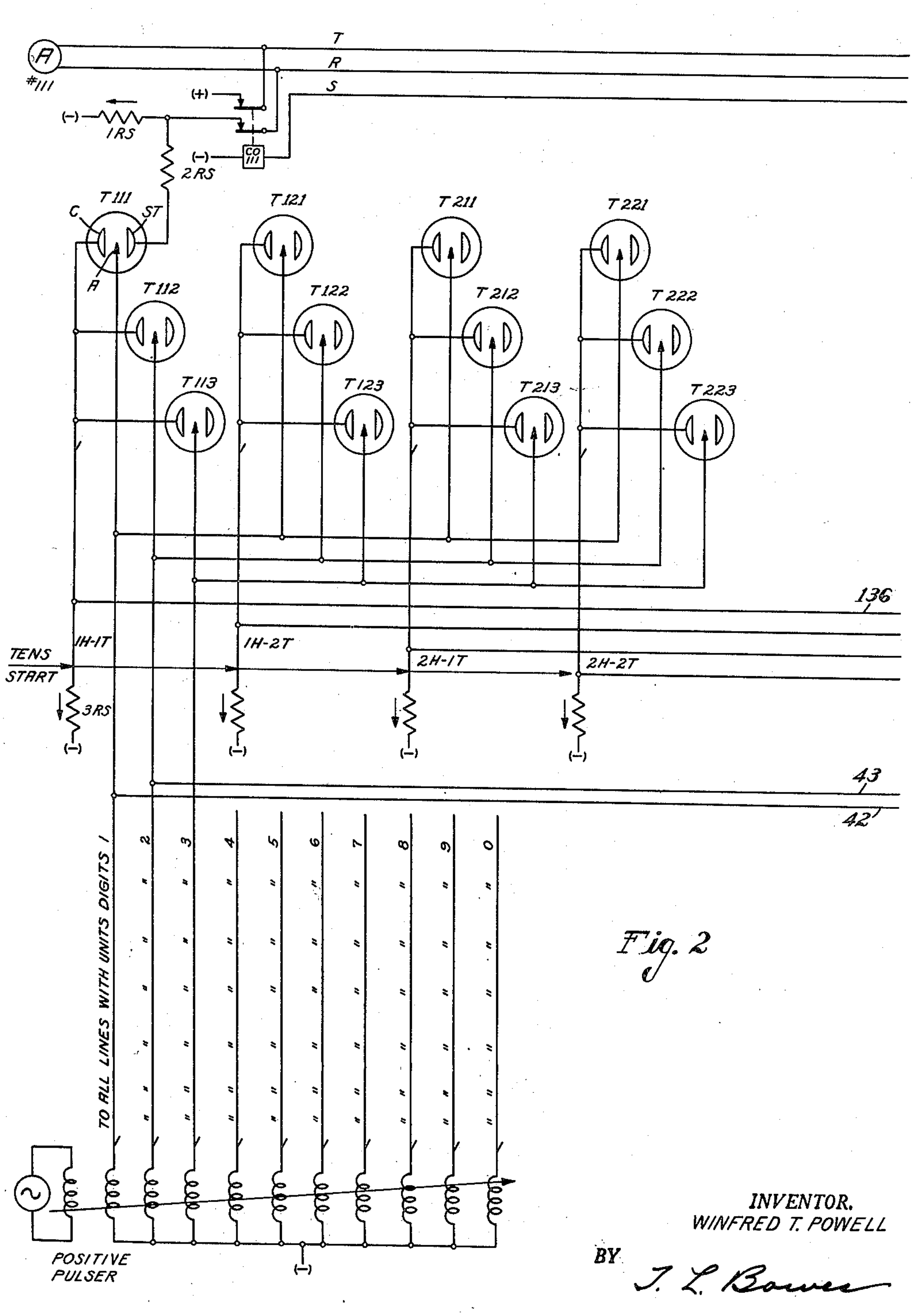
Fig. 2 illustrates one line circuit, its associated line tube, together with eleven other similar tubes and their connections to the common positive pulser.
Figure 3:
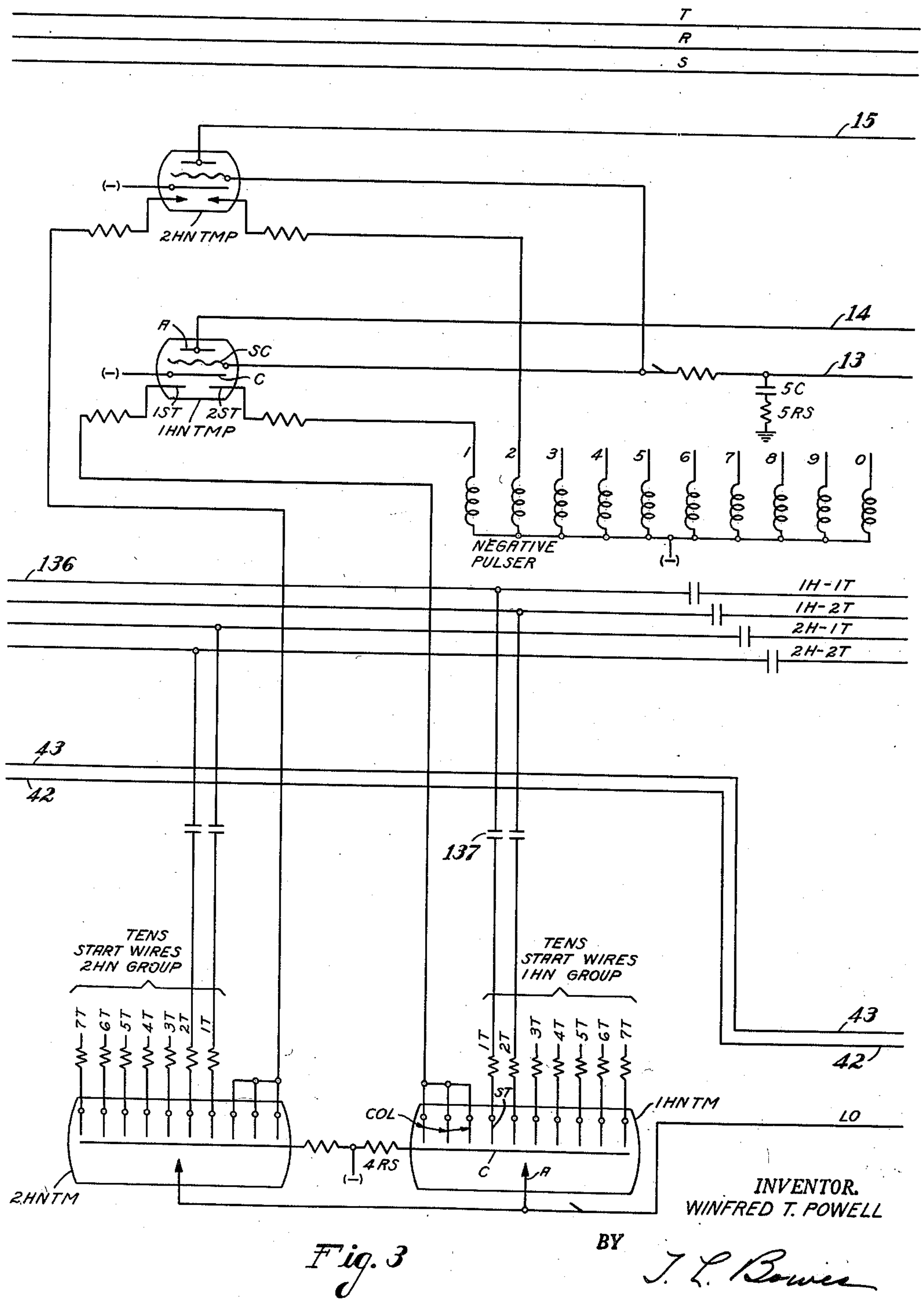
Fig. 3 shows connections of two of the hundreds marking tubes, together with their associated horizontal row repeater or slave tubes and their connections to the common negative pulser.

In this disclosure, positive and negative phased pulses are used in connection with the operation of certain of the vacuum tube circuits, as will be later pointed out in detail, these phases being obtained from any suitable source of A. C. as indicated in the lower left hand portion of Fig. 2. By means of the coupling between the windings, as illustrated by the long arrow, momentary pulses are delivered to the ten circuits for operating the vacuum tubes in various combinations. Impulse generators designed to produce momentary impulses of either positive or negative polarity are disclosed in Holden Patents #2,288,815 of June 9, 1942 and #2,252,766 of August 19, 1941. The pulses produced by the impulse generator illustrated in the lower left hand portion of Fig. 2 are assumed to be positive in character; that is they are positive pulses superimposed upon the negative source of direct current. The pulses produced by the impulse generator of Fig. 3 are in phase with those above mentioned, but in this impulse generating device negative impulses are produced and superimposed on the negative direct current source of potential. In other words, while the impulse generator of Fig. 2 is sequentially producing positive pulses in the ten common conductors associated with this pulse generator, the impulse generator of Fig. 3 is sequentially producing negative impulses in phase with those of Fig. 2 and applying them to the corresponding ten conductors leading from this negative pulser.

Figures 1, 1B, 1C:
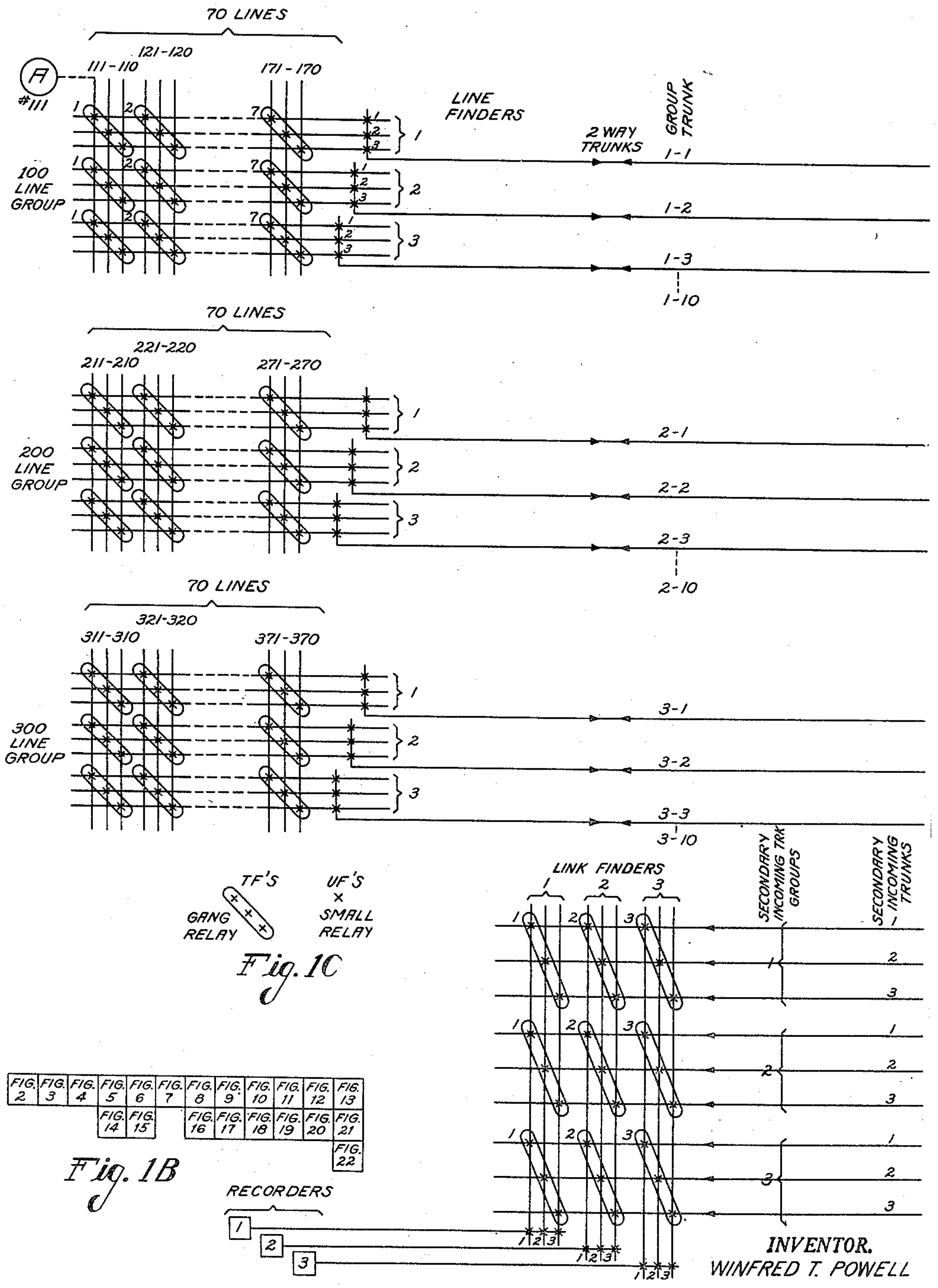

It is believed that this invention will best be understood by considering that it is applied to a relay type automatic telephone system of 700 lines capacity, arranged in 10 line groups, each serving 70 lines, as indicated to the left of Fig. 1. It will be obvious, that in the event of an overload or underload of the trunk groups, due to traffic conditions, lines may be removed or added to any of the hundred line groups to relieve the condition.

All vacuum tubes illustrated are of the cold cathode type, thus requiring no filaments to be energized, although it will be understood that tubes of the hot filament type may be provided if desired.

The usual individual line relays are replaced by small three element cold cathode tubes, one complete line circuit and the tubes for twelve line circuits being illustrated in Fig. 2.

Figure 1A:
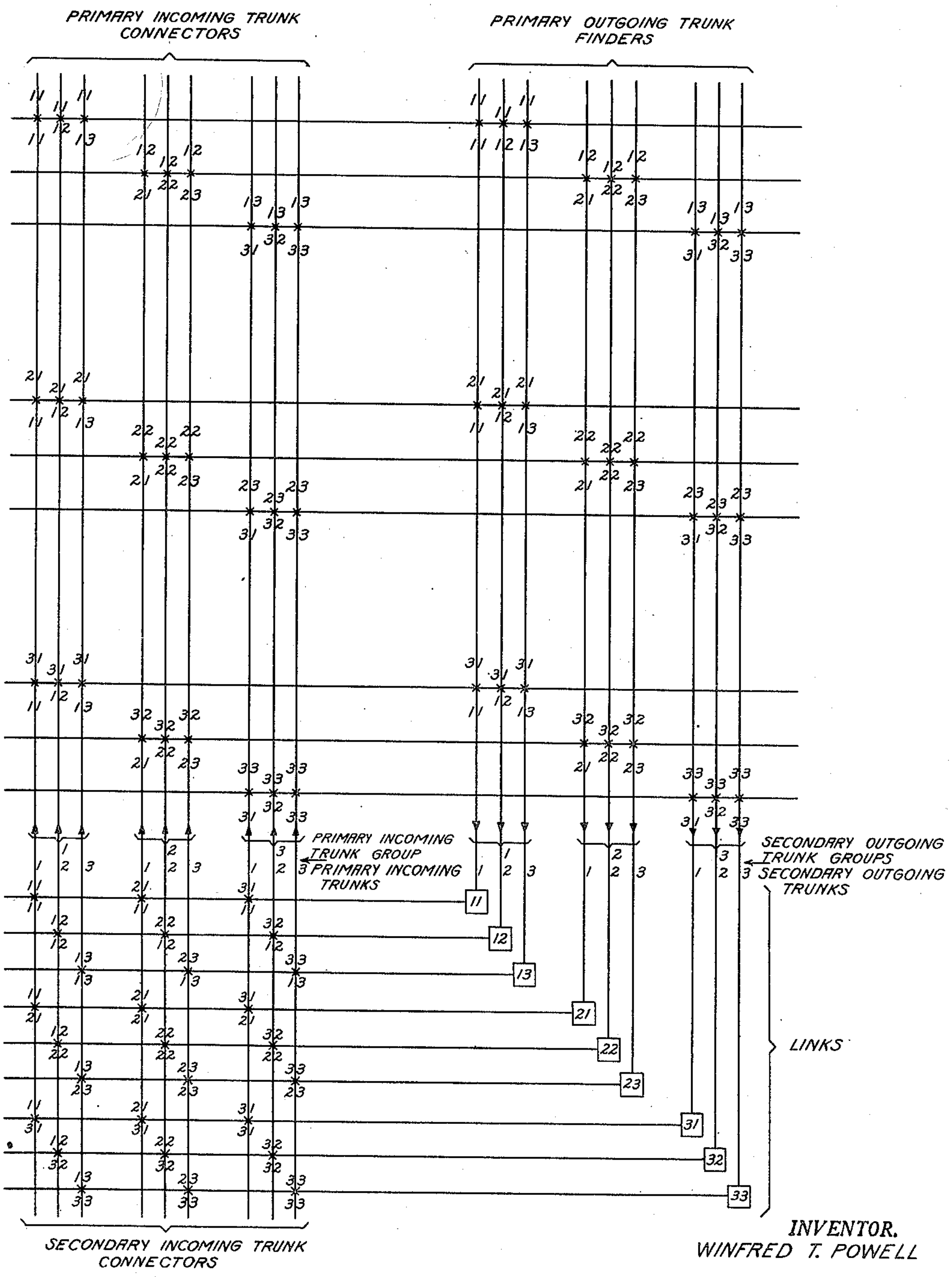

In describing the operation of this system, it will be convenient to refer to certain line and trunk connections illustrated in Figs. 1 and 1A as being in vertical and horizontal rows, and it will also be convenient to refer to the trunks leading from the line finders as two-way trunks, since these trunks take care of calls outgoing from a line of the group as well as calls incoming to a line of the group. The numbers associated with the relays and trunks of the Fig. 1 and Fig. 1A drawings have a particular significance. For example, 1, 2 and 7 associated with the group of enclosed X's in the first 100 line group of lines means that each one of these gang relays, when operated, connects the associated ten lines to the ten horizontal conductors. The numerals 1, 2 and 3 associated with the single X's of a line finder indicate that lines having units digit 1, 2 or 3 of the ten above mentioned are selected and connected to the associated two-way trunk.

The two-way trunks are given reference numerals to indicate the number of the group and the number of the trunk. For example, 1—1 means trunk #1 in line group #1, 2—3 means trunk #3 in line group #2, etc.

Referring to Fig. 1A, the numerals associated with the relays indicated by the cross marks indicate the number of the two-way trunk in the horizontal row which is connected to the associated trunk in the vertical row. For example, 1—1 x 1—1 means two-way trunk #1 of the #1 group is connected to the #1 trunk of the #1 group of trunks illustrated by the vertical lines when the associated relay is operated. Similarly, 2—3 x 3—2 means that the operation of this relay connects the #3 trunk of the #2 two-way trunk group to the #2 trunk of the #3 group. It will be obvious that the numbers associated with the primary incoming trunk connectors are the same as those associated with the outgoing trunk finders since both refer to outgoing and incoming trunks of the same link. In the detailed description, when referring to the operation of these relays, it will be specifically pointed out whether the incoming trunk connector or outgoing trunk finder is involved.

The two-way trunks appearing in contacts of primary incoming trunk connectors and in contacts of primary outgoing trunk finders are selected in accordance with whether the call is an originating or a terminating connection. On originating calls the primary outgoing trunk finders connect the two-way trunks to secondary outgoing trunks, each of which is connected to a link circuit. This is indicated by the arrow heads which indicate that the call is towards the link. On terminating calls the secondary incoming trunk connectors connect the links to the primary incoming trunks and the primary incoming trunk connectors connect the primary incoming trunks to the two-way trunks. This is indicated by the arrow heads which lead away from the link.

The links have access to a common group of recorders by way of a link finder associated with each recorder, which link finder can select any one of 100 links. The links are numbered as indicated in the rectangles in a manner which indicates the particular link finder relays which are operated to associate a link and a recorder. For example, link #11 will be selected by operating the #1 gang and the #1 small relay of the link finder, while link #33 will be selected by operating the #3 gang relay and the #3 small relay of the associated link finder.

Each group of 10 two-way trunks has access to the secondary outgoing trunks in each of 10 secondary outgoing trunk groups, thus providing a spraying or spreading arrangement so that an originating call on a two-way trunk of any two-way trunk group has access to a secondary outgoing trunk in any of the 10 secondary outgoing trunk groups. The same spraying arrangement is provided for connecting any secondary incoming trunk of any secondary incoming trunk group to a primary incoming trunk of any of the primary incoming trunk groups.

GENERAL OPERATION

The operation in general is, when a call is originated on line number 111, for example, the removal of the receiver at the telephone closes a circuit which fires the associated line tube, and this tube operates the proper hundreds marking tube to mark the hundreds group in which the originating call is located. The operation of any hundreds marking tube (of which there are ten) effects the operation of a lock-out relay for marking this as an originating call and for blocking the circuits to any terminating call at this time. The operation of the appropriate hundreds marking tube locks out all other tubes of this group and operates the proper hundreds marking relay.

Next comes the operation of the proper tens marking tube (of which there are seven) in accordance with the vertical group in which the calling line is located. In the above example, since line number 111 is calling, hundreds marking tube #1 and tens marking tube #1 will be fired. The firing of the tens tube effects the operation of an associated tens marking relay, which in combination with the operated hundreds marking relay marks the group of ten lines to be served by a particular group of ten two-way trunks. When the tens marking tube operates, it likewise locks out all other tubes of this group.

A test is now made for an idle two-way trunk of the two-way trunk group which has access to a group of secondary outgoing trunks in which there is an idle secondary outgoing trunk. For example, if the #1 two-way trunk in the #1 line group is idle when line #111 calls, and if all of the ten secondary outgoing trunks of the #1 secondary outgoing trunk groups are busy, then the #1 two-way trunk of the #1 line group will not be chosen even though it is idle, since it has no access to an idle secondary outgoing trunk. This is accomplished by making a matching test by means of a matching tube and matching relay, as will be described in detail.

Assuming that the #1 secondary outgoing trunk of the #1 secondary outgoing trunk group is idle, and that the #1 two-way trunk of the #1 line group is idle when line #111 calls, then the primary outgoing trunk finder relay 1—1 x 1—1 will be operated for extending the calling line to link #11 which is link #1 in the #1 group. The originating call is also effective to operate one of the ten units marking tubes for operating one of a common group of ten units marking relays.

After the hundreds, tens and units of the calling line and the primary and secondary trunks have been marked, the proper line finder relays are operated for extending the calling line by way of a two-way trunk and the secondary outgoing trunk to the chosen link. The impulse (CB) and holding (SA and SAP) relays of the link are now operated, which is effective to connect the link to an idle recorder, after which dial tone is transmitted to the calling line.

The four digits of the wanted number are now dialed and after the dialing operation is completed a marking test is made for connecting the called line by way of the proper tens and units finder relays of an idle two-way trunk to an idle incoming primary trunk of a group having access to the link in use, by way of a secondary incoming trunk associated with this link. The stations digit, which is recorded in the recorder, is transferred to the station selecting relays of the link and the recorder is released for use by another calling party.

The called line test is made in the link circuit and the busy relay will be operated if the line is busy or the ringing relays will function if the line is idle. It will thus be seen that only enough recorders are required to handle simultaneous dialing connections, since these units are discharged as soon as the dialing operation is terminated. In the illustrated example, only 10 hundreds marking tubes are provided, one for each group of lines.

Two of these tubes are illustrated in Fig. 3, 1HNTM serving the 100 line group and 2HNTM serving the 200 line group. Tube 1HNTM is provided with seven start electrodes ST which serve the seven start circuits individual to the seven vertical or tens groups of the first hundred line group. The remaining three start electrodes COL are connected together and serve as a collector for transferring the operation over to the associated repeater tube 1HNTMP. Tube 2HNTM is provided with seven start electrodes which serve the seven start circuits individual to the seven vertical or tens groups of the second hundred line group. Similar tubes are provided for the additional hundred line groups.

The anodes A of the line tubes (T111, etc.) are connected to the positive pulser commons of the impulse generator, with the pulse lead for phase #1, for example, being connected in multiple to the anodes of all line tubes having units digit #1. The remaining pulse leads are connected in common to the anodes of the other line tubes as indicated by the notation associated with these leads.

Ten horizontal tube marking repeaters 1HNTMP, 2HNTMP and 3HNTMP to 0HNTMP, inclusive (the latter 8 not shown), are provided in order that one horizontal group having calling lines therein may be served to the exclusion of other horizontal groups.

Figure 5:
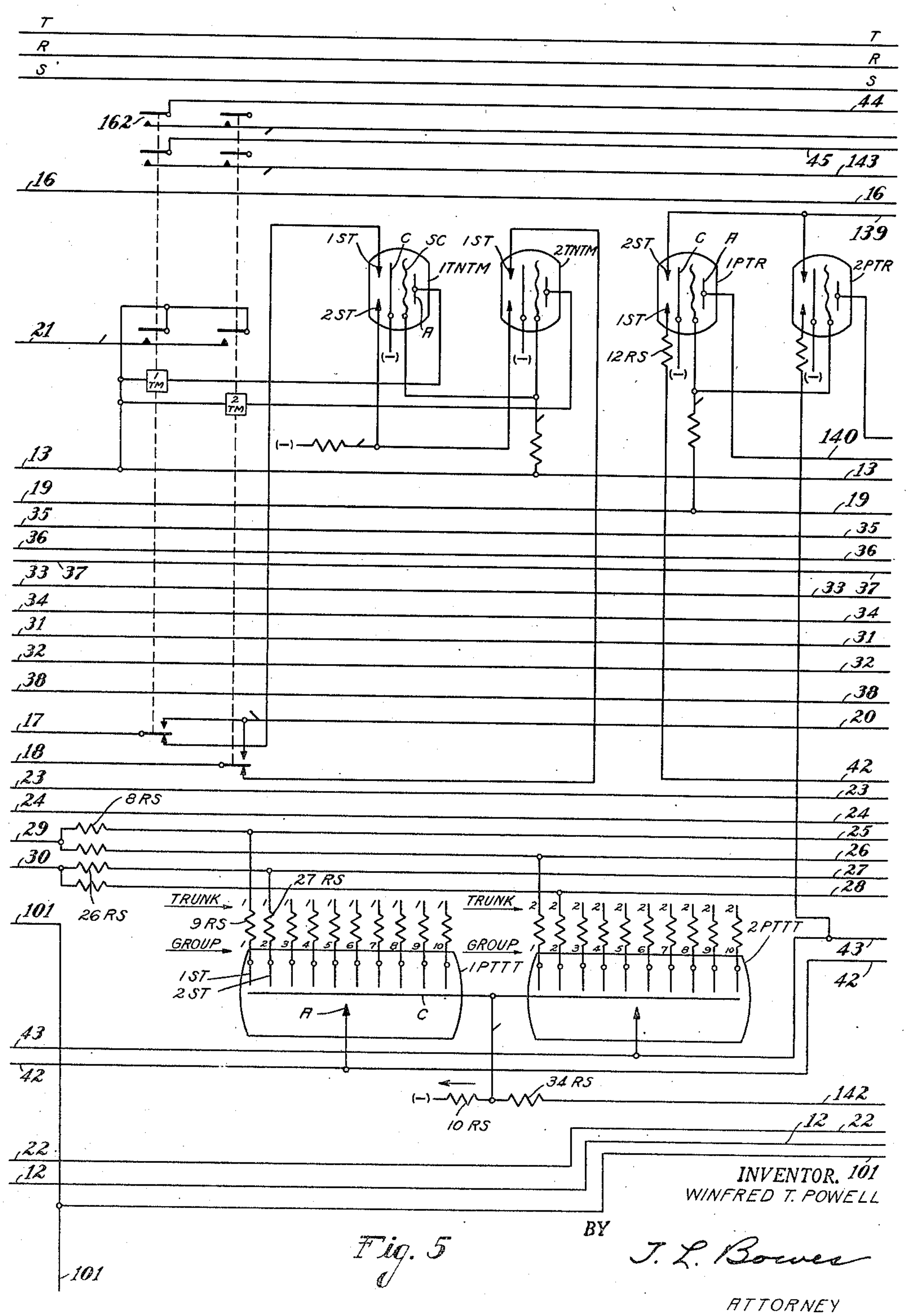
Fig. 5 shows a sufficient portion of the tens marker tubes and their connections, together with a sufficient portion of the two-way trunk test tubes for an understanding of the manner in which these elements of the system function.

A group of 7 tens marker tubes (1TNTM and 2TNTM being shown in Fig. 5) is provided to select one vertical group of lines to the exclusion of other vertical groups having simultaneous calls.

The two-way trunks are tested by a group of ten tubes (1PTTT and 2PTTT being shown in Fig. 5), each of these tubes serving ten two-way trunks. The ten two-way trunks served by tube 1PTTT are those which have access through a particular group of secondary outgoing trunks to the associated group of links. Consequently, the start electrodes of tube 1PTTT represent respectively primary trunk #1 in each of the ten two-way trunk groups. Likewise, the ten start electrodes of tube 2PTTT represent respectively primary trunk #2 in each of the ten two-way trunk groups; and the same is true of the other eight groups. As will be seen from the detailed description, the PTTT tubes are selectively operated on both originating and terminating calls.

The purpose of tube MTT (Fig. 6) is to make a matching test between secondary outgoing trunks (and primary incoming trunks) and the two-way trunk groups accessible to these secondary and primary trunks. The idle outgoing secondary trunks are individually tested by means of individual secondary trunk test tubes 1LT to 10LT (1LT and 2LT only being shown in Fig. 12). For example, the operation of tube 1LT marks secondary trunk #1 in each chosen group as being idle. When the matching test is made, the result of this test is registered by the operation of one of the ten tubes 1PTR to 10PTR, two of which are shown. For example, tube 1PTR marks outgoing secondary group #1 as the chosen group.

Figure 9:
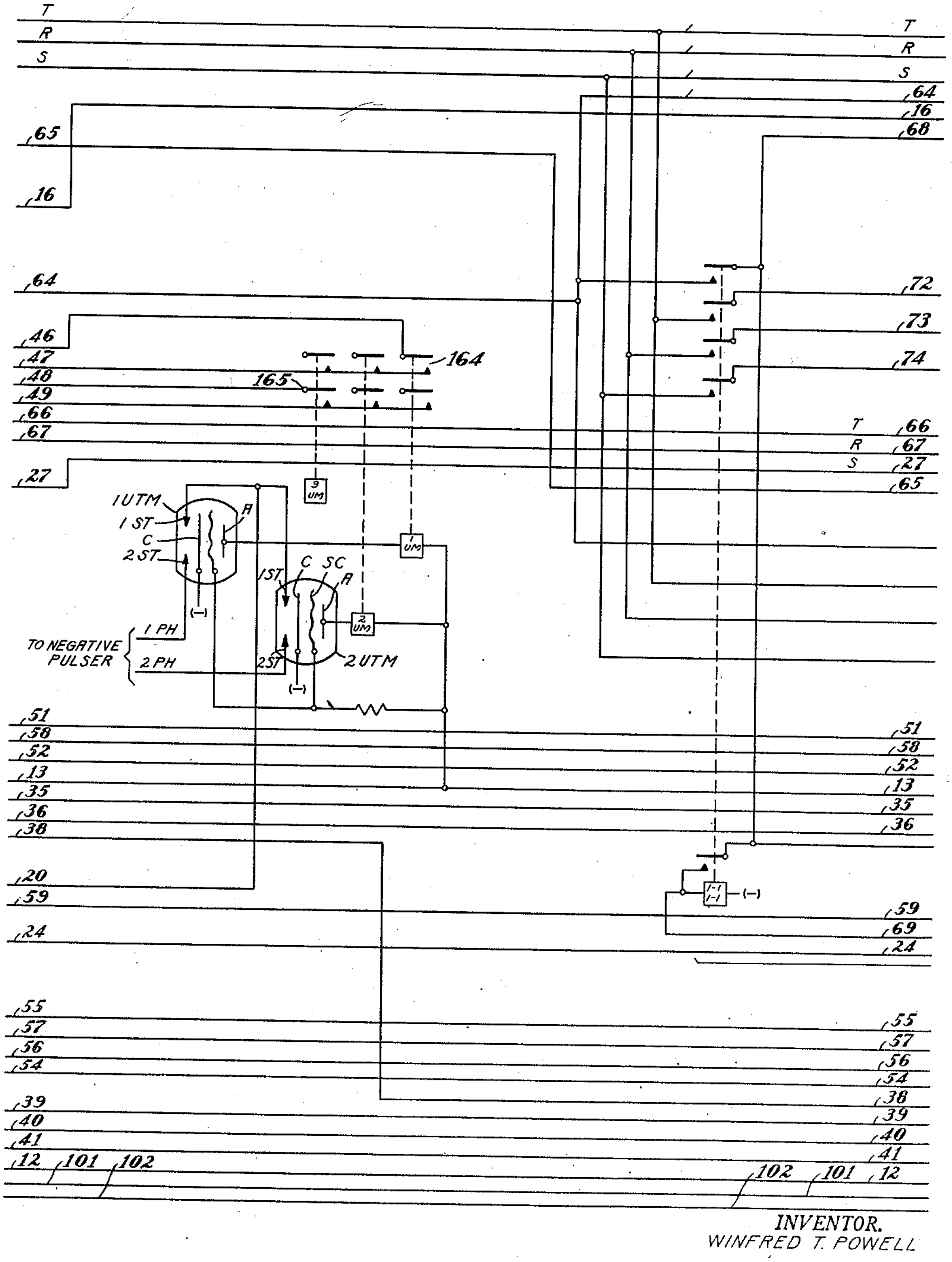
Fig. 9 shows two of the calling line units marking tubes and associated relays, together with one of the primary outgoing trunk finder relays.
Figure 10:
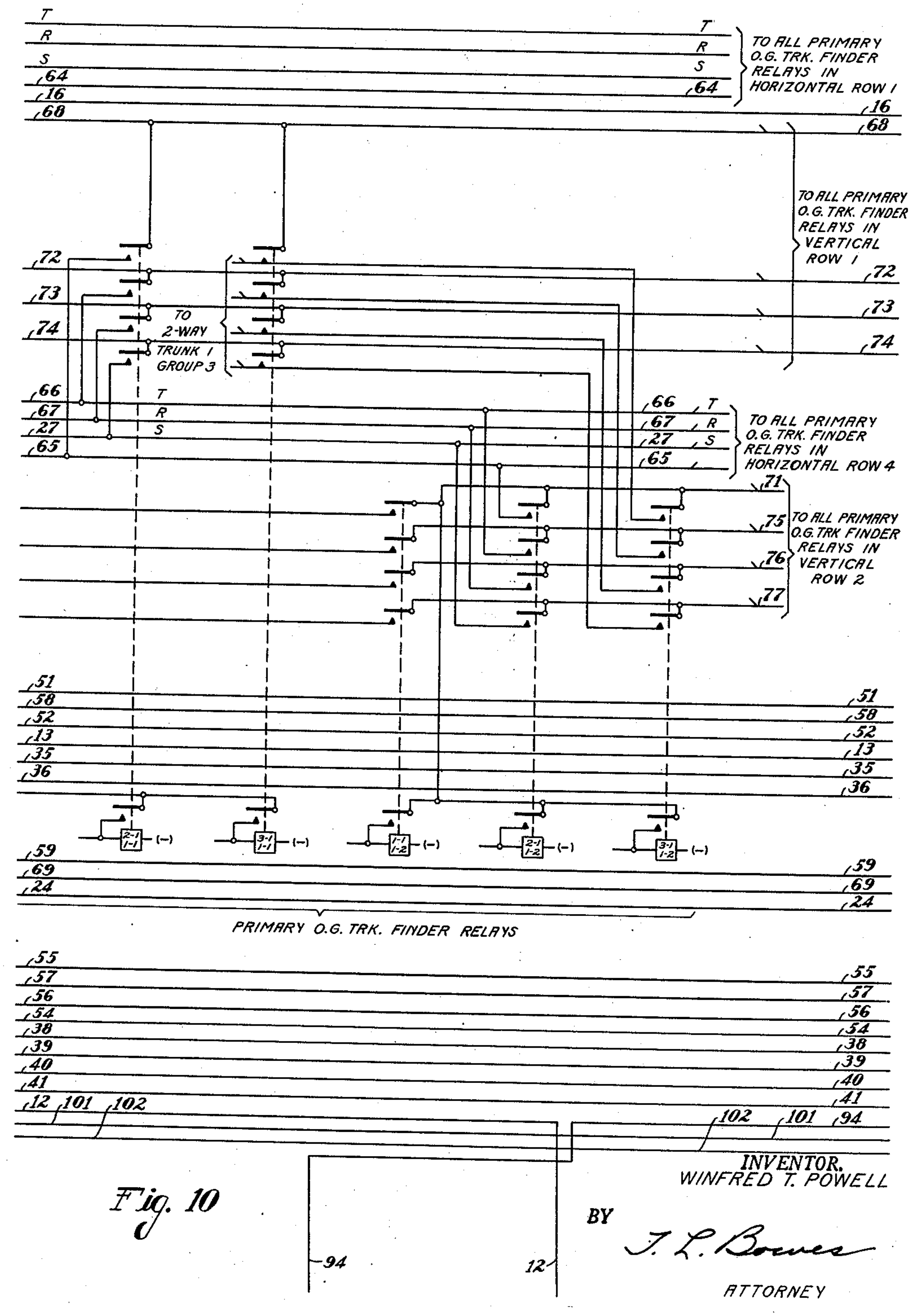
Fig. 10 illustrates additional primary outgoing trunk finder relays.
Figure 11:
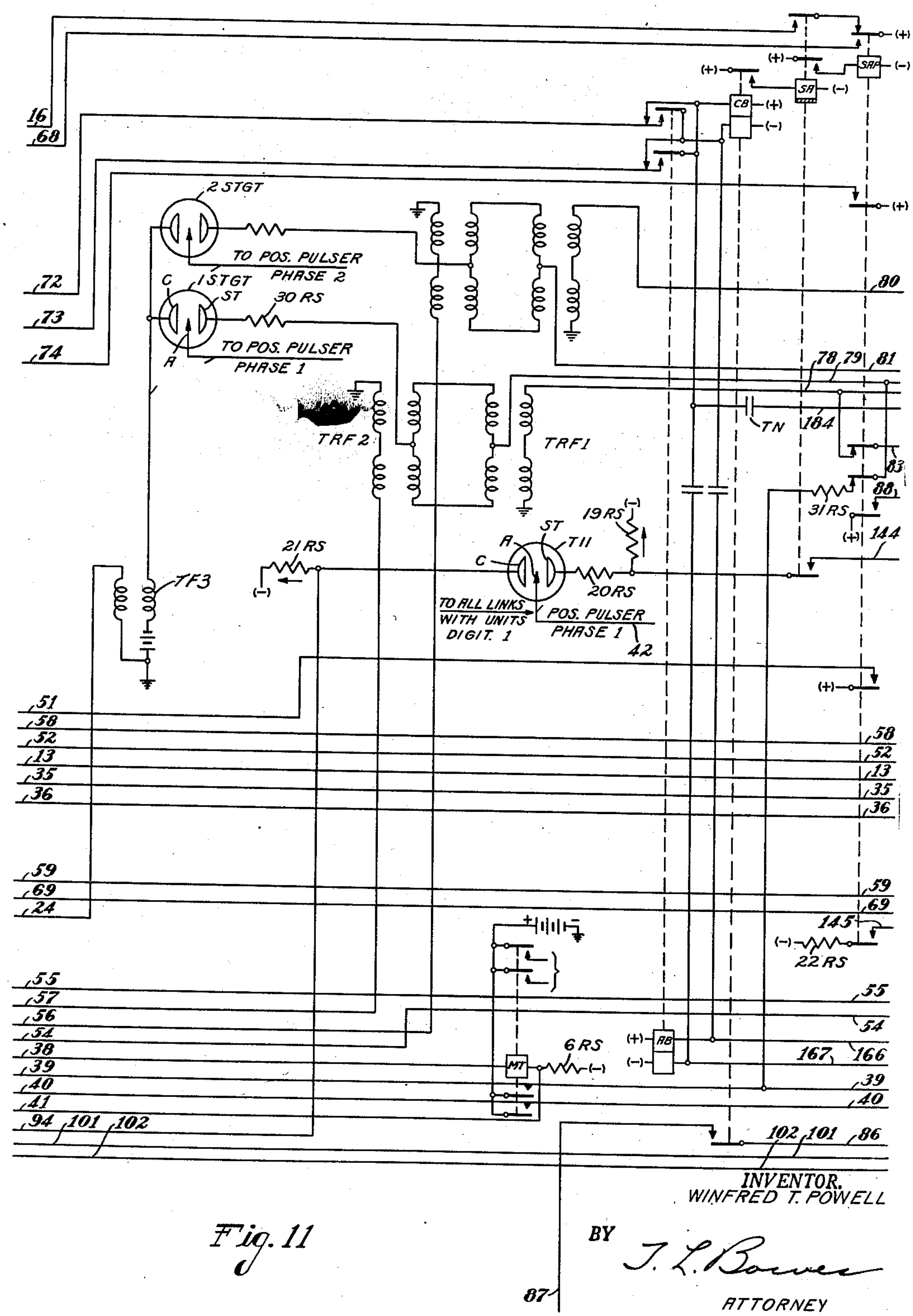
Fig. 11 shows two of the secondary trunk group tubes, the matching test relay and transformers, together with a portion of the relays of one of the link circuits.

The units marking tubes 1UTM to 0UTM, inclusive, mark the units digit of the calling line, there being two of these tubes shown in Fig. 9 for the purpose of illustration. For example, tube 1UTM fires to mark the calling line as one having units digit #1. The tens marking tubes 1TNTML and 2TNTML are for the purpose of marking the tens digits of the links. The units marking tubes 1UTML and 2UTML are for the purpose of marking the units digit of the links.

From the above explanation of the operation of the system in general, it will be noted that there are numerous tubes used in common for marking paths over which connections are established. It is believed that a more complete understanding of the operation of the system may be obtained from a detailed circuit description, assuming that line #111 initiates a call and dials #2131. This represents a call for station #1 on line #13 in the #2 hundreds group.

*Detailed description*

Removing the receiver at calling substation A (assumed to be station #111 and a dial telephone) closes a circuit from (+), break contact of cut-off relay CO111, tip line conductor T, substation circuit, ring line conductor R, break contact of relay CO111 and resistance 1RS to (−). This causes direct current to flow through resistance 1RS in the direction indicated by the arrow, which is effective to make the right-hand terminal of resistance 1RS positive with respect to its left-hand terminal. This positive potential is applied to start electrode ST of tube T111 (individual to the calling line) by way of resistance 2RS.

This primes tube T111 for firing and when the positive pulser applies a positive pulse to the #1 phase common conductor leading to anode A of tube T111, the tube fires and permits current to flow between the anode and cathode C.

Since the cathodes of all the tubes individual to the lines in the same group (having the same tens digit) are connected in common and extended through resistance 3RS, current will flow through this resistance in the direction of the arrow, thus rendering the upper terminal of this resistance positive with respect to its lower terminal.

This positive potential on the upper terminal of resistance 3RS is applied to start electrode ST of the hundreds tube marker 1HNTM by way of conductor 136 and condenser 137 in series with resistor 1T associated with tube 1HNTM. Since the cathode C of tube 1HNTM is at negative potential, the tube ionizes and fires, establishing a flow of current from (+) (which is the positive terminal of the tube source of current), break contact of relay 2TLOP, break contact of relay TLO, break contact of relay RL, winding of relay LO, conductor LO, anode A of tube 1HNTM, cathode C and resistance 4RS to the negative terminal of the tube source of supply.

It will be understood that any line tube in the #1 hundreds group, when fired, is effective to fire the #1 hundreds tube marker 1HNTM, in the above described manner, since the separate tens marking conductors for this hundreds group are connected to separate start electrodes of tube 1HNTM. Likewise, the firing of any line tube in the #2 hundreds group fires tube 2HNTM since the separate start wires of this group go to separate start electrodes of tube 2HNTM.

Since lock-out relay LO is included in the above circuit, this relay is operated. It will be obvious that this lock-out relay will likewise be operated by the firing of the #2 hundreds tube marker 2HNTM, as well as by the firing of any of the other hundreds tube markers (not shown), since lock-out conductor LO is connected in common to all of these tubes. The purpose of operating relay LO at this time is to mark the originating call and to prevent the operation of the connecting relays in response to a terminating call at this same time. This is done by the opening of the lower break contact of relay LO, the terminating circuit controlled by this contact being described later.

Relay LO closes an obvious circuit for operating its repeater relay LOP. The firing of tube 1HNTM sets up a positive potential on the collector electrodes COL, which potential is applied to the start electrode 1ST of the #1 hundreds marking repeater tube 1HNTMP, there being one of these latter tubes for each of the HNTM tubes.

Recalling that the negative pulser applies negative pulses to the ten indicated conductors 1 to 0, inclusive, in synchronism with the application of positive pulses to the corresponding conductors 1 to 0, inclusive, applied by the positive pulser, a negative pulse is applied to start electrode 2ST of tube 1HNTMP at the same instant that a positive pulse is applied to electrode 1ST, as above described. This fires tube 1HNTMP, causing current to flow in its anode-cathode circuit from (+), make contact of relay LO, break contact of relay 2TLOP, winding of hundreds marking relay 1HM, conductor 14 and anode-cathode circuit of tube 1HNTMP to the negative terminal of battery. This current flow through the tube operates relay 1HM to mark the #1 hundreds group as being the group in which the calling line is located. It will be noted that the anode circuit of tube 1HNTMP is completed to positive battery at a make contact of relay LO, which relay was operated as above described to mark this as an originating call. The purpose of this circuit through a make contact of relay LO and a multiple connection to positive battery through a break contact of relay LOP will be explained in connection with the clearing out of these marking tubes when the connection is established from the calling line to the link circuit.

The operation of any HNTMP tube establishes a potential on the screen electrode of the operated tube, such as electrode SC in the present example, and since all screens of these tubes are connected in multiple, this potential acts as an instantaneous lock-out circuit to prevent the operation of a second tube of the group after one tube has been fired. Current flows from ground applied to the screen, including a common resistance 5RS and a common condenser 5C, thus producing a voltage drop across this resistance for making the grids of the other tubes less positive, thereby preventing a second tube in the group from transferring its ionization to the main anode.

The operation of relay 1HM, as above described, marks this call as being in the #1 hundreds group, that is, two-way trunk group #1 indicated in Fig. 1.

When relay 1HM is operated, all of the start wires in the first hundreds group are extended to the condenser-resistor network connected to contacts of the tens marking relays. Two of these start wires of the first hundreds group are shown, (1H—1T and 1H—2T) as being connected to the condenser-resistor network. It will be understood that additional start wires, one for each tens digit in the first hundreds group, will be connected through make contacts of relay 1HM to a similar condenser-resistor network. By way of the condenser-resistor network, start conductor 1H—1T is extended by way of conductor 17, break contact of tens marker relay 1TM to start electrode 1ST of tens tube marker 1TNTM. Similarly, start conductor 1H—2T is extended by way of the condenser-resistor network, conductor 18, break contact of tens marker relay 2TM to start electrode 1ST of the second tens tube marker 2TNTM. Furthermore, the additional start conductors of the first hundreds group are extended by way of contacts of additional tens marking relays (not shown) to additional tens tube markers (not shown) in the same manner illustrated for the first two start circuits.

By this arrangement, if there are simultaneous calls in two or more of the tens groups of the marked hundreds group, only one of the tens tube markers will operate because the circuit for firing these tubes comes from the positive pulser, with the separate start electrodes of the separate tens tube markers being connected to separate phases of the positive pulser.

In the present example, a pulse applied at the #1 phase of the positive pulser again causes current to flow through tube T111 and resistor 3RS for applying a positive pulse to conductor 1H—1T and thence by way of the condenser-resistor network and conductor 17 for firing tube 1TNTM, since this tube has a negative potential connected to its lower start electrode 2ST. The firing of tube 1TNTM is effective to lock out all other tubes of this group, since the screen electrodes of the group are connected to a common terminal, the lock-out circuit functioning the same as described above in connection with tube 1HNTMP. It will be obvious that the firing of any tens marker tube is effective to lock out all other tubes of the group, thus preventing the operation of more than one tens marking relay at any one time. It will be apparent that the operation of relay 1HM, plus the #1 phase positive pulse through any T tube (of Fig. 2) in the #1 hundreds group and in the #1 tens group will be effective to fire tube 1TNTM in the manner just explained. Calls originating in the second tens group of the first hundreds group will condition start conductor 1H—2T for firing tube 2TNTM by way of conductor 18 and the break contact of relay 2TM. Likewise, the other start conductors 2H—1T and 2H—2T will be conditioned by calls originating in the first and second tens groups respectively of the second hundreds group for firing these same tens tube markers as previously described, except in this case, relay 2HM would be operated by tube 2HNTMP instead of relay 1HM in the present example.

The firing of tube 1TNTM causes current to flow in the anode circuit of this tube which is effective to operate relay 1TM. This circuit extends from (+), make contact of relay LO, conductor 13, winding of relay 1TM and anode-cathode circuit of the tube to (−). The operation of relay 1TM marks the calling line as being in the #1 tens group and the operation of relay 1HM marks the calling line as being in the #1 hundreds group.

In this example, the #1 group of ten lines (111 to 110 inclusive) in the hundreds group is marked to be served by some one of the two-way trunks in the #1 group. Referring to Figs. 1 and 1A, it will be noted that there are ten two-way trunks in this hundreds group, each of which has access to ten secondary outgoing trunks in a separate secondary outgoing trunk group. It will be assumed that two-way trunk #1 is idle and that secondary outgoing trunk #1 in secondary outgoing trunk group #1 is idle. This means that relays TF1 and UF1 of the line finder must be operated for connecting line #11 to the #1 two-way trunk of this group. Furthermore, it means that primary outgoing trunk finder relay 1—1 x 1—1 must be operated to extend the calling line to link #11, which is associated with the

#1 secondary outgoing trunk in the #1 secondary outgoing trunk group.

The operation of relay 1HM, previously described (or any other HM relay), closes a circuit for operating the matching test relay MT. This circuit may be traced from (—), resistance unit 6RS, winding of relay MT, conductor 38 and make contact of relay 1HM to (+). With relay MT operated and with a secondary outgoing trunk in secondary outgoing trunk group #1 being idle, a circuit is completed for firing trunk group test tube 1STGT. This happens at the time the positive pulser applies the #1 phase pulse to conductor 42, the circuit being traced from (+), right-hand windings of transformer TRF1, break contact of relay 1SAP of link #1 in group #1, conductor 83, resistor 7RS and positive pulser phase #1. This positive pulser phase #1 conductor is the same conductor connected to the first phase of the group in the lower left hand portion of Fig. 2 (conductor 42). The positive pulse induces a current in the left-hand windings of transformer TRF1, which current flows through the right-hand windings of transformer TRF2, from whence it is applied to start electrode ST of tube 1STGT and since this same positive pulse is applied to the anode A of this tube, the tube is fired.

Figure 13:
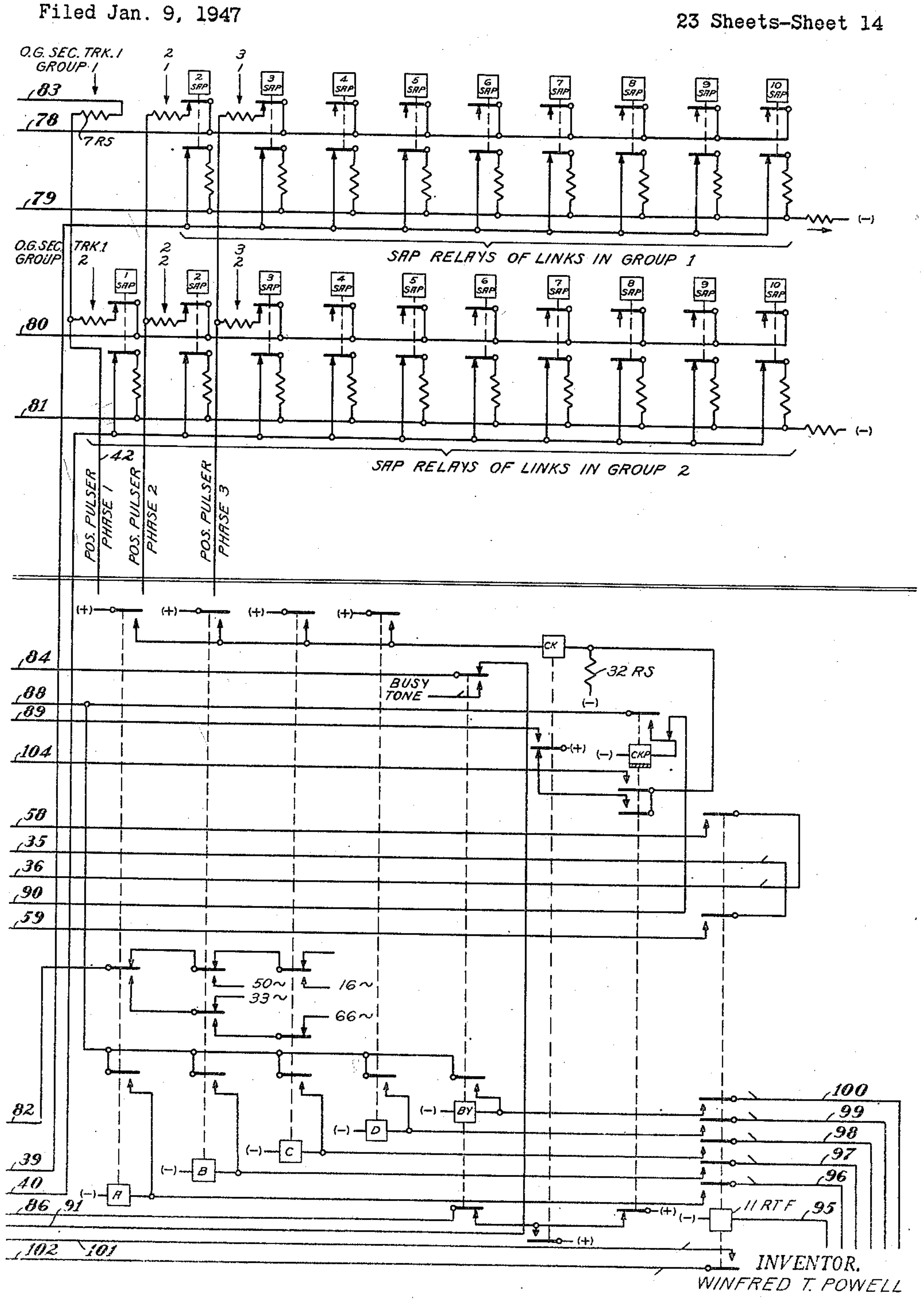
Fig. 13 shows additional relays of one of the links (above mentioned), together with a schematic showing of the SAP relays of all links in groups 1 and 2, to illustrate the method of marking idle and busy links.
Figure 15:
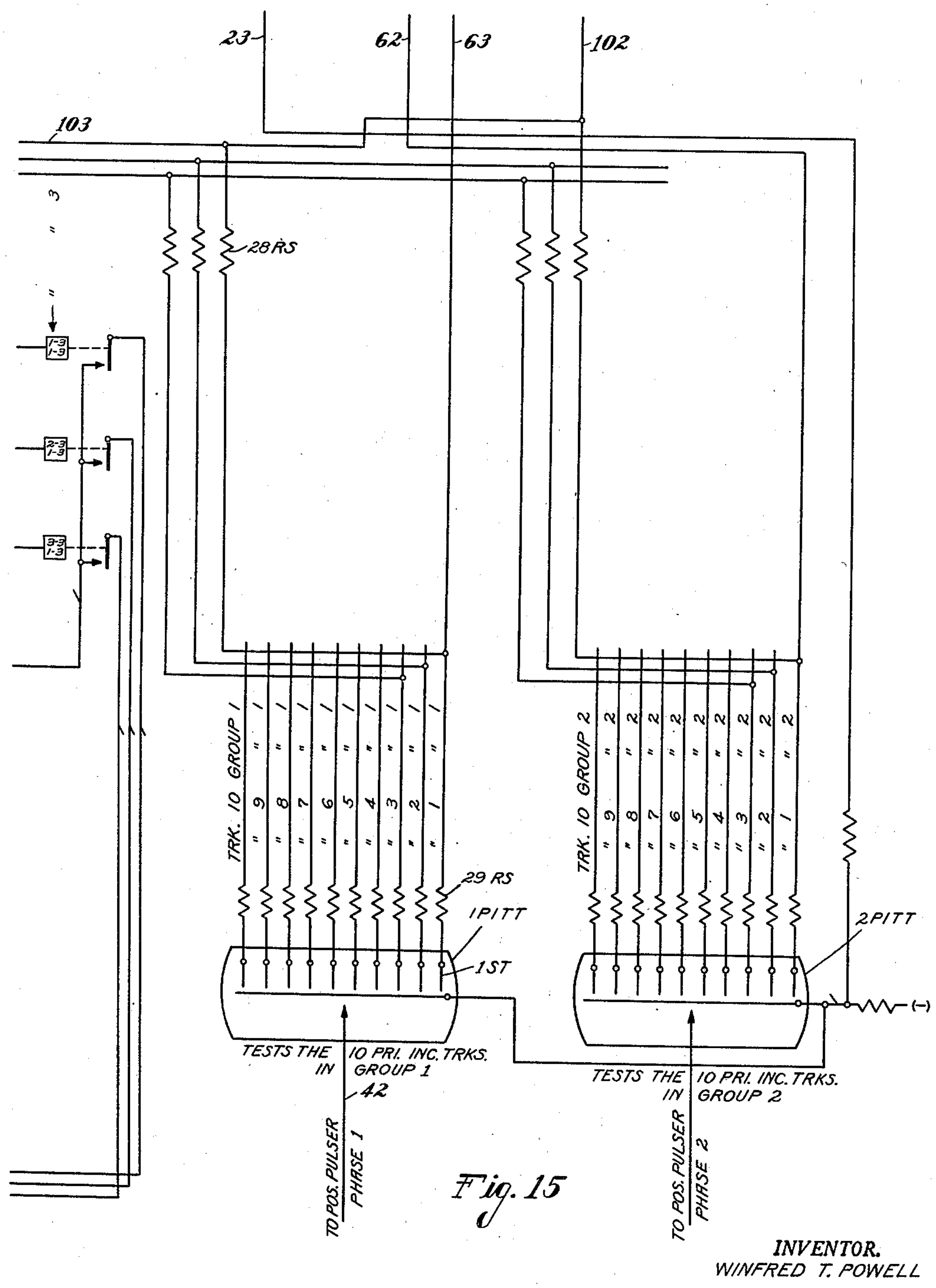
Fig. 15 shows additional secondary incoming trunk connecting relays, together with two of the primary incoming trunk test tubes.

It will be understood that tube 2STGT will fire in the event that there are no idle secondary trunks in secondary group #1, but that there are one or more idle trunks in group #2. Other STGT tubes are provided (not shown) for taking over control for marking other secondary groups as having idle trunks. The circuits for controlling the other STGT tubes may be readily traced from other contacts of the MT relay, which close similar circuits to the back contacts of the SAP relays associated with other groups, as shown, in Fig. 13.

Primary trunk test tube 1PTTT is now fired because it is assumed that the #1 two-way trunk of the #1 group is idle. The circuit for firing this tube may be traced from (+), lowermost make contact of relay 1HM, conductor 29, resistor 8RS and resistor 9RS to start electrode 1ST of tube 1PTTT. If this #1 trunk is busy, there will be a ground potential on the sleeve conductor of this trunk, as will be later described. This ground by-passes the positive potential from the contact of relay 1HM just described so that it cannot be applied to the associated start electrode of tube 1PTTT. With this trunk idle, however, positive potential is applied to electrode 1ST at the same time that the positive impulse, phase #1 is applied to anode A of this tube by way of conductor 42. This happens at the same instant that tube 1STGT was fired, as previously explained. It will be understood that, if two-way trunk #1 in group #1 is busy and if two-way trunk #2 in group #1 is idle, then tube 2PTTT will be fired by the impulse of phase #2. Similar conditions prevail for other trunks of the group, it being understood that other PTTT tubes may be fired by phase #1, but they will be ineffective because tube 1PTR will have taken over and will lock out other PTR tubes as will shortly be described.

When tube 1PTTT fires to marks the idle two-way trunk in group #1 and when tube 1STGT fires to mark the secondary group that has an idle trunk therein, as above described, matching test tube MTT will be fired. This is effected by the #1 phase positive pulse being applied to the #1 anode 1A of tube MTT at the same instant that a positive potential is applied to start electrode 1ST of tube MTT, by the current-flowing through the anode-cathode circuit of tube 1PTTT and resistor 10RS for making the right-hand terminal of this resistor positive with respect to its other terminal, which terminal is connected to start electrode 1ST of tube MTT by way of resistor 34RS and conductor 142. This is because tube 1PTTT is fired by phase #1.

A negative potential is applied to start electrode 2ST of tube MTT at this same instant. This is because the momentary firing of tube 1STGT provides a pulse through the right-hand winding of transformer TF3 by way of conductor 24. This applies a negative pulse to start electrode 2ST of tube MTT, by transformer action from the left-hand winding of transformer TF3, which pulse is transmitted from this transformer winding, conductor 24, break contact of relay 1TLOP and conductor 22 to electrode 2ST of tube MTT.

From the above it will be obvious that matching test tube MTT fires when the PTTT tube fires to mark an idle two-way trunk in group #1 and when the STGT tube fires to mark a secondary group having an idle trunk. It will be obvious that, if relay MT should happen to operate just at the time the #2 phase positive pulse is applied to conductor 43, tube 2STGT will fire and tube 2PTTT would fire to take over and to mark two-way trunk #2 as being idle and selectable.

With tube MTT firing at phase #1, tube 1PTR is fired at this same instant to mark secondary group #1 as the chosen group having an idle secondary trunk therein. In the event that tube MTT should fire at phase #2, then tube 2PTR would fire to mark secondary group #2 as a group having an idle trunk therein. Furthermore, the firing of a PTR tube is effective to lock out or prevent the firing of any other tube of this group, since the screen electrodes of these tubes are connected in common for providing the lock-out feature in the same manner previously described in connection with the HNTMP tubes.

Tube 1PTR is fired at this time because the #1 phase positive pulse is applied to its start electrode 1ST at the same time that current flows in the anode-cathode circuit of tube MTT for transferring a positive potential to start electrode 2ST of tube 1PTR. The #1 phase positive pulse circuit may be traced from conductor 42 and resistor 12RS to the #1 start electrode 1ST of tube 1PTR. Since, at this same instant, current is flowing through tube MTT and resistor 11RS in the direction of the arrow, the left-hand terminal of this resistor is rendered positive, so that positive potential may be traced through condenser C8 and conductor 139 to start electrode 2ST of tube 1PTR.

Secondary group marking relay 1SGM is now operated over a circuit which may be traced from —, cathode-anode circuit C-A of tube 1PTR, conductor 140, winding of relay 1SGM, conductor 19 and make contact of relay LO to (+). The operation of relay 1SGM marks secondary group #1 as the group in which the marked secondary trunk is located.

Since relay 1HM has marked the #1 hundreds group as the group in which the calling line is located, since relay 1SGM has marked secondary group #1 as being a group having an idle trunk therein and since relay 1TM has operated to mark the tens group in which the calling line is located, line finder relay TF1 of two-way trunk

#1 in group #1 may now be operated because this two-way trunk is the only two-way trunk of the #1 group having access to all of the outgoing secondary trunks of the first outgoing secondary trunk group. A circuit for operating relay TF1 may be traced from (+), make contact of relay 1HM, conductor 33, make contact of relay 1SGM, conductor 143, front contact of relay 1TM, conductor 45 and winding of relay TF1 to (−).

Referring back to the point where relay 1SGM was operated by the firing of tube 1PTR to mark secondary group #1 as the selected group, the operation of relay 1SGM (or any other SGM relay) closes a circuit for releasing relay MT by short-circuiting its winding. This circuit may be traced from (+), make contact of relay 1SGM, conductor 41 and the terminal between the winding of relay MT and the resistance connected in series with this relay winding to (−). It will be understood that the PTTT tubes, the STGT tubes and the MTT tube are only fired momentarily just at the instant of application of the pulse from the common pulser. The HNTM tubes, the HNTMP tubes, the TNTM tubes and the PTR tubes are maintained in their conductive condition after being fired until released or quenched, as will be later described.

It now becomes necessary to mark the particular secondary outgoing trunk in the chosen group. In the present example, trunk #1 is to be selected, consequently the #1 link test tube 1LT will be fired. The circuit for firing this tube may be traced from the #1 phase of the positive pulser (Fig. 13), conductor 42, resistor 7RS, conductor 83 and right-hand windings of transformer TRF1 to ground. This induces an impulse into the left-hand windings of transformer TRF1, which impulse is extended to the right-hand windings of transformer TRF2 for inducing a corresponding impulse into the left-hand windings of transformer TRF2, which impulse is extended by way of conductor 57, make contact of relay 1SGM, conductor 55 and resistor 13RS to start electrode 1ST of tube 1LT. This circuit also extends to corresponding start electrodes of other LT tubes by way of resistor 13RS. At this same instant, a pulse from the #1 phase of the negative pulser is applied to start electrode 2ST of tube 1LT only. Since pulses from the negative pulser are applied to the other LT tubes in different phase relations from that above described, none of these other tubes will fire, but tube 1LT will be fired for causing current to flow in its anode-cathode circuit for operating the #1 secondary trunk marking relay 1STM, to mark outgoing secondary trunk #1 in the chosen group. There is a lock-out circuit associated with the LT tubes, comprising the screen grids of all of these tubes connected in multiple and in series with a resistor to ground on conductor 13 by way of a make contact of relay LO, the purpose of which is to prevent the operation of more than one of these marking tubes at any one time, in the same manner as previously described for the HNTMP tubes. It will be understood that if secondary outgoing trunk #1 is busy, relay SAP of the link associated with this trunk will be in its operated position so that tube 1LT cannot be fired by the #1 phase pulse. If trunk #2 is idle, the associated SAP relay will be normal and tube 2LT will be fired by the #2 phase impulse.

Since relay 1STM has been operated to mark secondary outgoing trunk #1 as idle, since relay 1SGM has been operated to mark secondary outgoing trunk group #1 as being the one in which the required secondary trunk is located and since relay 1HM marks two-way trunk #1 as being the trunk to which the calling line will be connected, it now becomes necessary to operate primary outgoing trunk finder relay 1—1 x 1—1. The circuit for operating this relay extends from (+), make contact of relay 1HM, conductor 37, make contact of relay 1SGM, conductor 52, make contact of relay 1STM, conductor 69 and winding of relay 1—1 x 1—1 to (−).

From the above example, it will be understood that the combinations of the three marking relays HM, SGM and STM, which are operated, determine the various primary outgoing trunk finder relays which will be selectively operated. The above example explains how relay 1—1 x 1—1 is operated by a combination of the #1 relay of each of these three designated relays. If relay 1HM and relay 1SGM are operated in combination with relay 2STM, then primary outgoing trunk finder relay 1—1 x 1—2 would be operated because the second secondary trunk of the first group is marked. Similarly, if relay 2HM is operated in combination with relay 1SGM and relay 1STM, then primary outgoing trunk finder relay 2—1 x 1—1 would be operated because the same link is to be connected to the first two-way trunk in the second hundred line group. Or if the 2HM, the 2SGM and the 2STM relays are operated, then primary outgoing trunk finder relay 2—2 x 2—2 would be operated because the second link in the second group is to be connected to the second two-way trunk in the second hundred line group. It is believed that other combinations are obvious.

Units tube marker 1UTM is now fired over a circuit extending from the #1 phase positive pulse which is transmitted through tube T111 (transmitted at a subsequent pulse period from that which effected the operation of tube 1HNTM) this pulse extending over conductor 1H—1T, make contact of relay 1HM, condenser-resistor network, conductor 17, make contact of relay 1TM, conductor 20, to the 1ST start electrodes of all UTM tubes. Since this is a #1 phase pulse, the 1UTM tube will fire at this time because a #1 phase negative pulse is applied to its other start electrode 2ST. The firing of tube 1UTM operates units marking relay 1UM over a circuit extending from (+), make contact of relay LO, conductor 13, winding of relay 1UM and anode-cathode circuit of tube 1UTM to (−). The screen grid electrodes of the UTM tubes are connected in a lock-out circuit similar to that described in connection with the HNTMP tube circuits.

Since relay 1HM marks a two-way trunk in group #1, since relay 1SGM marks a secondary outgoing trunk in group #1 and since these two relays mark two-way trunk #1 in group #1, the combination of these two relays and relay 1UM selects finder relay UF1 of two-way trunk #1 in group #1. The circuit for relay UF1 extends from (+), make contact of relay 1HM, conductor 34, make contact of relay 1SGM, conductor 47, make contact of relay 1UM, conductor 46 and winding of relay UF1 to (−).

With finder relays TF1, UF1 and with primary outgoing trunk finder relay 1—1 x 1—1 operated, it will be seen from Fig. 1 that this combination of relays selectively connects line #111 to link #11, which corresponds to secondary outgoing trunk #1 in secondary outgoing trunk group #1. The closed circuit across the calling line operates calling bridge relay CB of the link over a circuit which may be traced from (+), winding of calling bridge relay CB, break contact of answering bridge relay AB, conductor 72 of the #1 outgoing secondary trunk in the #1 outgoing secondary trunk group, make contact of relay 1—1 x 1—1, tip conductor T of the #1 two-way trunk in the #1 two-way trunk group, make contact of relay UF1, make contact of relay TF1, tip conductor T of the calling line, through the calling substation, ring conductor R of the calling line, make contact of relay TF1, make contact of relay UF1, ring conductor R of two-way trunk #1 in group #1, make contact of relay 1—1 x 1—1, conductor 73 of the #1 secondary outgoing trunk in the #1 secondary outgoing trunk group, break contact of relay AB and winding of relay CB to (—).

Relay CB operates to close an obvious circuit for slow acting relay SA and relay SA closes an obvious circuit for operating its repeater relay SAP.

Relay SAP closes a locking circuit for finder relays TF1 and UF1 extending from (+), make contact of relay SAP, conductor 68, make contact of relay 1—1 x 1—1, conductor 64 and make contacts of the operated finder relays and thence by way of the windings of these relays to (—). The operated primary outgoing trunk finder relay is also locked over a circuit extending from (+) on conductor 68, as above traced, by way of a make contact and winding of relay 1—1 x 1—1 to (—).

The #1 two-way trunk is made busy over a circuit from (+), make contact of relay SAP, conductor 74, make contact of primary outgoing trunk finder relay 1—1 x 1—1, conductor S and conductor 25 to the point between resistors 8RS and 9RS, thus preventing another call (which may subsequently apply (+) potential from the tube battery to conductor 29) from triggering tube 1PTTT by applying potential to its 1ST electrode.

Cut-off relay CO of the calling line is operated over a circuit extending from (+), make contact of relay SAP, conductor 74, make contact of relay 1—1 x 1—1, sleeve conductor S of the #1 two-way trunk in the #1 group, make contact of relay UF1, make contact of relay TF1 and sleeve conductor S of the calling line, winding of cut-off relay CO—111 to (—).

Relay SA of the link circuit also closes a circuit for operating release relay RL, which circuit is completed before relay SAP has time to operate, the circuit extending from (+), break contact of relay SAP, make contact of relay SA, conductor 16, and resistance 14RS to (—). This current flow through resistance 14RS in the direction of the arrow establishes a positive potential by way of resistance 15RS to start electrode ST of release tube RLT for firing this tube. Relay RL is operated in the anode-cathode circuit of tube RLT, the circuit being traced from (+), make contact of relay LO, winding of relay RL and anode-cathode circuit of RLT and resistor 16RS to (—).

Relay RL operates in this circuit and opens the circuit for relay LO, the latter relay releasing. Since the winding of relay LO is included in the circuit of tube 1HNTM, the opening of the LO relay circuit removes potential from the anode of this tube and quenches the tube. The release of relay LO also opens up the circuit from (+), extending through the winding of relay 1HM and the anode-cathode circuit of tube 1HNTMP for quenching this tube and for releasing relay 1HM. The release of relay LO also opens up and releases the lock-out repeater relay LOP.

Since the anode circuit of tube 1TNTM, including relay 1TM, is included in the circuit to (+) by way of a make contact of relay LO, the release of this relay also quenches tube 1TNTM and releases relay 1TM. Likewise, the release of relay LO removes (+) potential from conductor 19 extending to the winding of relay 1SGM and the anode-cathode of tube 1PTR for quenching this tube and releasing relay 1SGM. Furthermore, the release of relay LO removes (+) potential from conductor 13 extending to the winding of relay 1STM and the anode-cathode circuit of tube 1LT for quenching this tube and releasing relay 1STM. Also, removing (+) from conductor 13 opens up the circuit of relay 1UM and tube 1UTM for quenching this tube and releasing this relay. Furthermore, the release of relay LO opens up the circuit of tube RLT and relay RL, thus quenching this tube and releasing the RL relay.

It will be pointed out at this time that, following the release of relay LO, the next originating call cannot function until relay LOP is released and since this latter relay is slow acting, a short time interval is measured off during which time no originating call can come in, thus permitting a terminating call to be marked. The reason another originating call cannot be marked until relay LOP releases, is that with relay LO released and with relay LOP operated, the circuit for the HM relays and the HNTMP tubes is maintained open to prevent the firing of one of these tubes during this measured time interval. With relay RL released, another HNTM tube can fire, but its associated HNTMP tube cannot fire to operate the HM relay until the release of the LOP relay. As will be later described, the release of relay LO, following an originating call, completes the circuit for a terminating test, which circuit extends to the winding of terminating lock-out relay TLO, thus giving a terminating call preference following an originating call, but if there is no terminating call waiting, then, after the above described measured time interval, another originating call can function. It will be explained in connection with a terminating call, how, following a terminating call a time interval is measured off to give preference to an originating call before the next terminating call can function. In this manner, originating calls alternate when several are awaiting attention.

*Time release*

Before proceeding with the description relating to the selection of the recorder and the dialing of the wanted digits, it will be explained how the circuits are released out in the event of a faulty condition which prevents the normal operation as above described.

The operation of any HM or TM relay closes a circuit from (+), make contact of relay LO, conductor 13, make contact of the HM or TM relay, conductor 21, resistor 17RS, condenser RCD and resistor 18RS to (—). This builds up a charge on condenser RCD, this charge being at a comparatively slow rate because of the resistors in the circuit. If the circuits fail to function and release out the HM and TM relays, as described, in a predetermined time, then the charge on condenser RCD builds up to the proper point for establishing a sufficient potential on the start electrode ST of time release tube TMRT for firing this tube and operating time release relay TMRR in its anode-cathode circuit. The operation of relay TMRR applies (+) to conductor 16, which fires release tube RLT in the same manner previously described when (+) was applied to conductor 16 by the operation of relay SA of the link. Release relay RL operates in the anode-cathode circuit of tube RLT for releasing relay LO as previously described. The release of relay LO opens up the circuit of tube TMRT and relay TMRR by removing (+) from conductor 13, thus quenching the tube and releasing the relay. In fact, the release of relay LO clears out the circuits so that another call may be initiated. The operation of relay RL applies (+) to the terminals between condenser RCD and resistor 18RS for short-circuiting and discharging condenser RCD, thus placing the timing circuit back in normal condition.

*Associating link with recorder*

Assuming that recorder #1 is idle, the operation of relay SA of the link closes a circuit from (+), break contact of recorder cut-off relay RCO, conductor 144, make contact of relay SA and resistor 19RS to (—). Current flows through this resistor in the direction of the arrow, thus establishing a positive potential by way of resistor 20RS to start electrode ST of tube T11. When the positive pulser applies a #1 phase pulse by way of conductor 42 to anode A of tube T11 the tube fires and causes current to flow in the anode-cathode circuit and through resistor 21RS to (—) in the direction of the arrow. Since the anode of this tube is energized by way of the #1 phase of the positive pulser, the tube will be fired only momentarily, that is, just during the very short interval that the #1 phase conductor 42 is energized.

Figure 22:
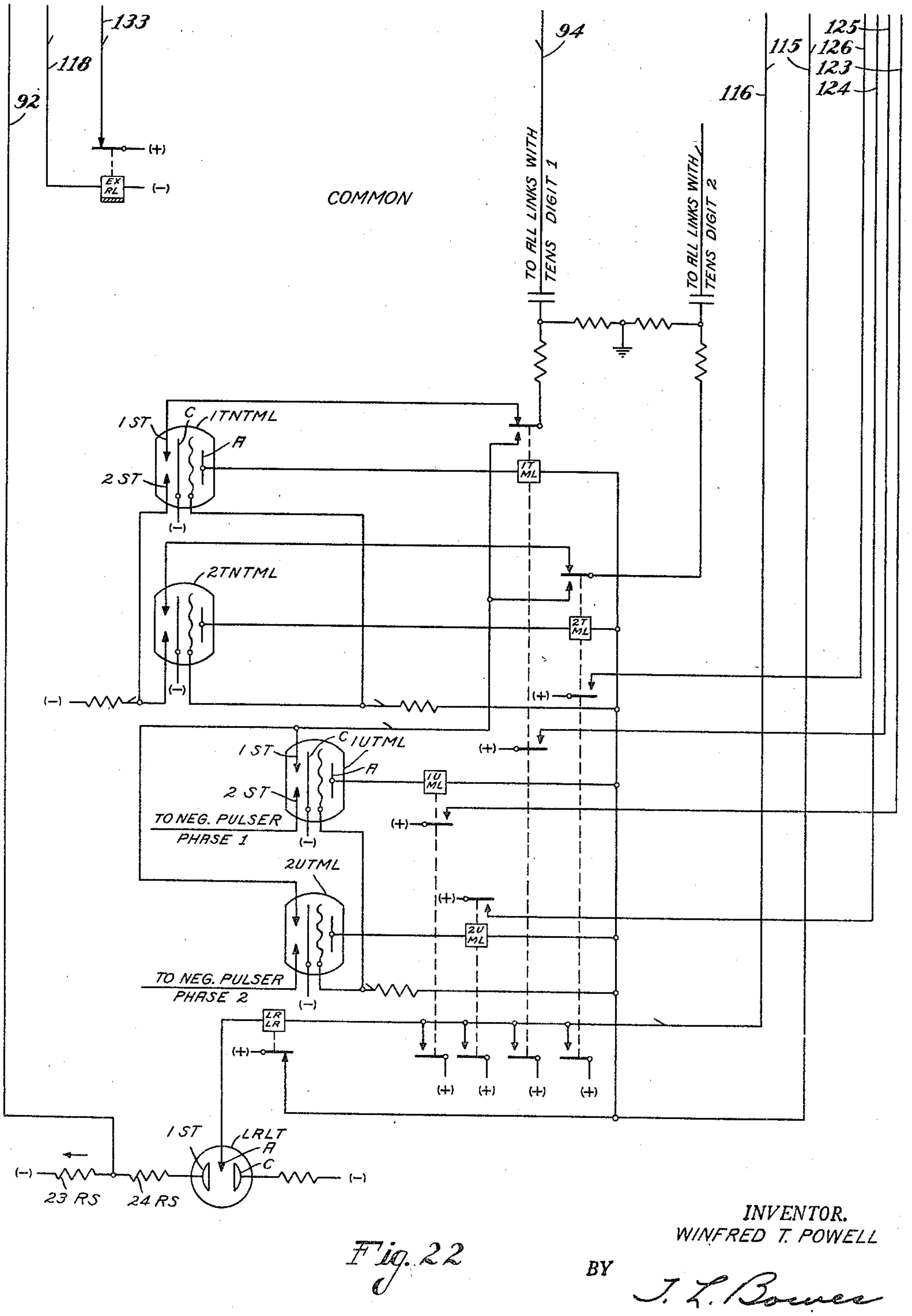
Fig. 22 shows certain common tubes and relays for controlling the marking of and the making of connections between the links and the recorders.

The current flowing through resistor 21RS establishes a positive potential on the terminal of this resistor to which conductor 94 is connected so that this positive potential is extended through the condenser and resistor network of Fig. 22 and break contact of relay 1TML to start electrode 1ST of the link tens marking tube 1TNTML. This application of positive potential to the start electrode of tube 1TNTML fires this tube during the instant that tube T11 is fired. The anode-cathode circuit of tube 1TNTML is connected through the link tens marking relay 1TML to (+) at the break contact of link release relay LRLR.

It will be noted that the #1 phase pulse lead conductor 42 is common to all links with units digit #1 and is connected to corresponding T tubes of these links. Similar connections to links with other units digits are connected to the other positive pulse leads. Since the calling link is #11, its tens digit is #1, and when tube T11 fires, current flows through its anode-cathode circuit as above described. It will further be noted that, if relay SA is operated at the instant of the closure of some other phase from positive pulser, tube T11 will wait until the positive pulser applies the #1 phase pulse.

From the above it will be seen that the firing of any T tube in the #1 tens group fires tube 1TNTML and the firing of this tube locks out other TNTML tubes by means of the multiple connection of the screen grids of all these tubes, the circuit functioning in the manner already explained in connection with the HNTMP tubes.

When tube 1TNTML is fired, current flows through the winding of relay 1TML, as previously described, this relay operates to mark the calling link as a link having tens digit #1. The operation of relay 1TML switches the circuit extending from the calling link by way of the condenser-resistor network from the TNTML tube to the UTML tubes. Since this extended start wire from the T tube of the calling link (conductor 94) is only energized at phase #1 of the positive pulser (since tube T11 is only fired at phase #1) the #1 units marker tube will have a positive pulse applied to its start electrode 1ST at the same instant that a negative impulse is applied to its start electrode 2ST. With positive potential on its 1ST electrode and with negative potential on its 2ST electrode, tube 1UTML is fired and a circuit is completed from (+), break contact of relay LRLR, winding of relay 1UML and anode-cathode circuit of tube 1UTML to (—). The firing of tube 1UTML likewise locks out all other UTML tubes by means of the multiplied screen grid circuits, in the same manner described in connection with the HNTMP tubes.

When relay SAP of the link is operated, a circuit is closed from (—), resistor 22RS, make contact of relay SAP, conductor 145, break contact of relay RCO and common conductor 85 to the 1ST start electrodes of all recorder tube markers RTM. At the time of the closure of this circuit, the RTM tube of an idle recorder will be fired as determined by the phase of the positive pulser which is closed at this time. It will be noted that any busy recorder will have the associated positive pulse phase lead opened at a back contact of the associated SA relay.

Assuming that recorder #1 is idle (relay SA de-energized) and that the positive impulser applies a #1 phase pulse at the instant relay SAP of the link is operated, this pulse applies a potential to start electrode 2ST of recorder tube marker 1RTM at the same instant that a (—) potential is applied to start electrode 1ST. This fires tube 1RTM and current flows in its anode-cathode circuit over a circuit extending from (+), break contact of relay LRLR, conductor 115, winding of recorder marker relay 1RM, conductor 146 and anode-cathode circuit of tube 1RTM to (—). Relay 1RM is operated in this circuit for marking recorder #1 as the one to be associated with the calling link.

With relays 1RM and 1TML operated, a circuit is closed from (+), make contact of relay 1TML, conductor 125, make contact of relay 1RM, conductor 147 and winding of tens finder relay TF1 to (—). With relays 1RM and 1UML operated, a circuit is closed from (+), make contact of relay 1UML, conductor 123, make contact of relay 1RM, conductor 148 and winding of relay UF1 to (—). The operation of relays TF1 and UF1 connects link #1 to recorder #1.

A circuit is now closed for operating calling bridge repeater relay CBP of the translator which extends from (+), break contact of relay CKP of the link, break contact of relay BY of the link, conductor 86, make contact of relay CB, conductor 87, make contact of relay TF1, make contact of relay UF1 and winding of relay CBP to (—). Relay CBP closes an obvious circuit for operating slow acting relay SA and this relay makes the recorder busy by opening the circuit of the associated positive pulse lead 42.

The operation of relay SA closes a circuit for operating recorder cut-off relay RCO of the link which extends from (+), winding of dial tone transformer DTT, make contact of relay SA, make contact of relay UF1, make contact of relay TF1, conductor 91 and lower winding of relay RCO to (—). The operation of relay RCO opens up the circuit to tube T11, for preventing any further firing of this tube. The operation of relay RCO also closes an obvious circuit for operating link finder release relay LFRL.

The operation of relay RCO closes a locking circuit for itself which extends from (+), make contact of relay SAP, conductor 88, make contact of relay RCO and winding of relay RCO to (—). Relay SA of the recorder closes locking circuits for the link finder relays which were operated (TF1 and UF1) extending from (+), front contact of relay SA, front contacts of the operated finder relays and their windings to (—).

Referring back to the operation of relay RCO of the link, a circuit is closed from (+), make contact of relay RCO, break contact of relay LFRL (this circuit being effective before relay LFRL has time to operate), common conductor 92 and resistor 23RS to (—). This establishes a positive potential at the terminal of resistor 23RS to which conductor 92 is connected, this potential being extended by way of resistor 24RS to start electrode 1ST of common link release tube LRLT. This fires tube LRLT and a current flows in its anode-cathode circuit, such circuit extending from (+), front contact of relay 1TML or front contact of relay 1UML, and winding of relay LRLR to the anode of tube LRLT. Relay LRLR operates in this circuit for opening up and releasing the operated TML and UML relays and for quenching the associated TNTM and UTM tubes by removing (+) from the common circuit leading to these relays and tubes.

The operation of relay LRLR also effects the release of relay 1RM and the quenching of its associated tube 1RTM by removing (+) from conductor 115. With the operated TM, UM and RM relays restored to normal, the anode circuit of tube LRLT is opened, the tube is quenched and relay LRLR is released.

This marks the point at which another link can be connected to another recorder, since all the common recorder marking tubes and relays have been restored to normal. The calling line is now connected to the recorder by way of the calling line circuit, the line finder associated with the two-way trunk, the primary outgoing trunk finder, the link and the link finder to the recorder.

*Dialing the called number*

When the recorder is seized, as above described, the operation of relay SA in the recorder closes a circuit for operating counting relay CX which extends from (+), make contact of relay SA, break contact of relay CRLP, stick conductor STK—1, break contacts of counting relays C0 to C1, inclusive, and winding of relay CX to (—).

Figure 19:
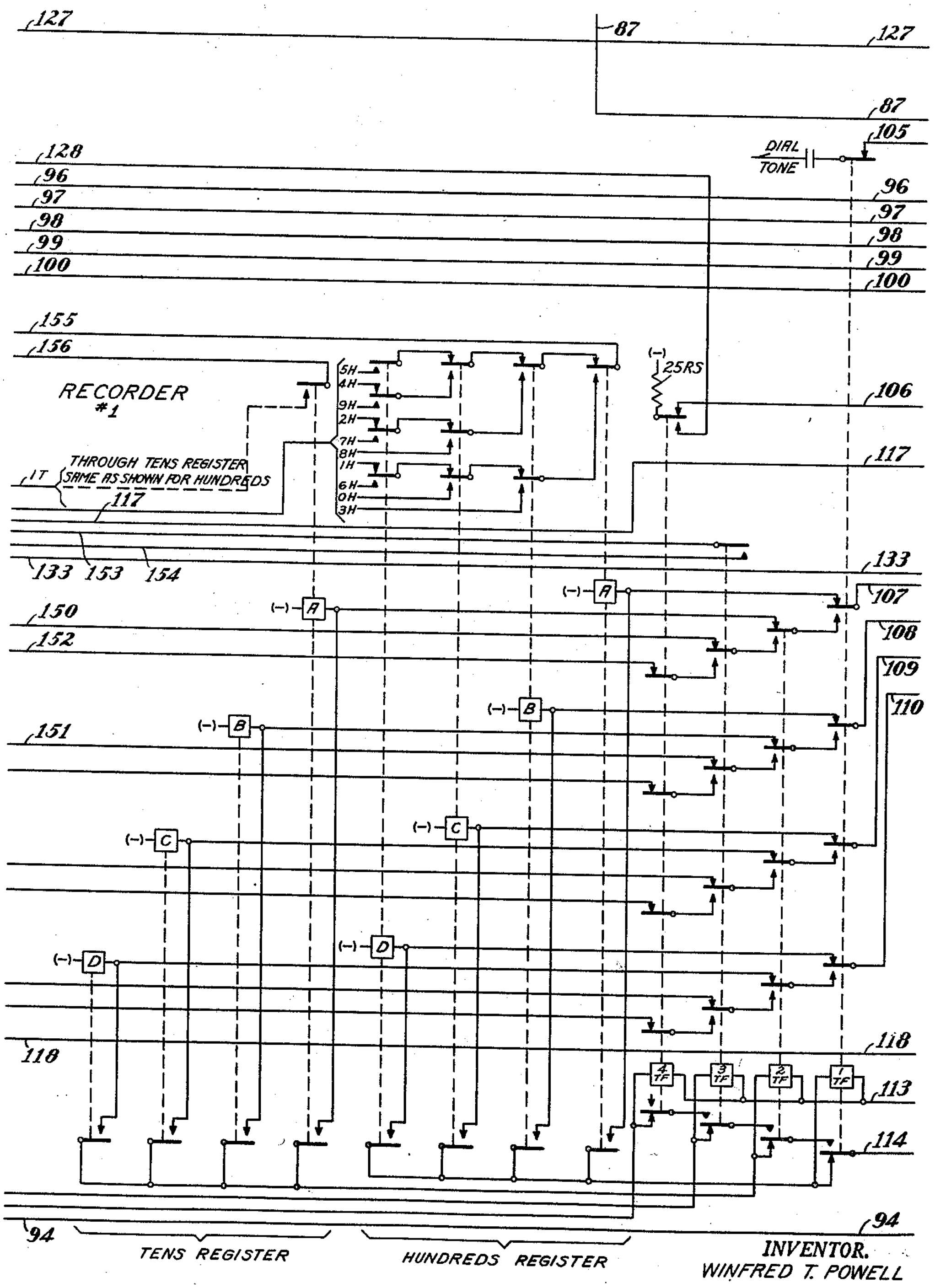
Fig. 19 shows the hundreds and tens register relays, together with the register transfer relays of the above mentioned recorder.
Figure 20:
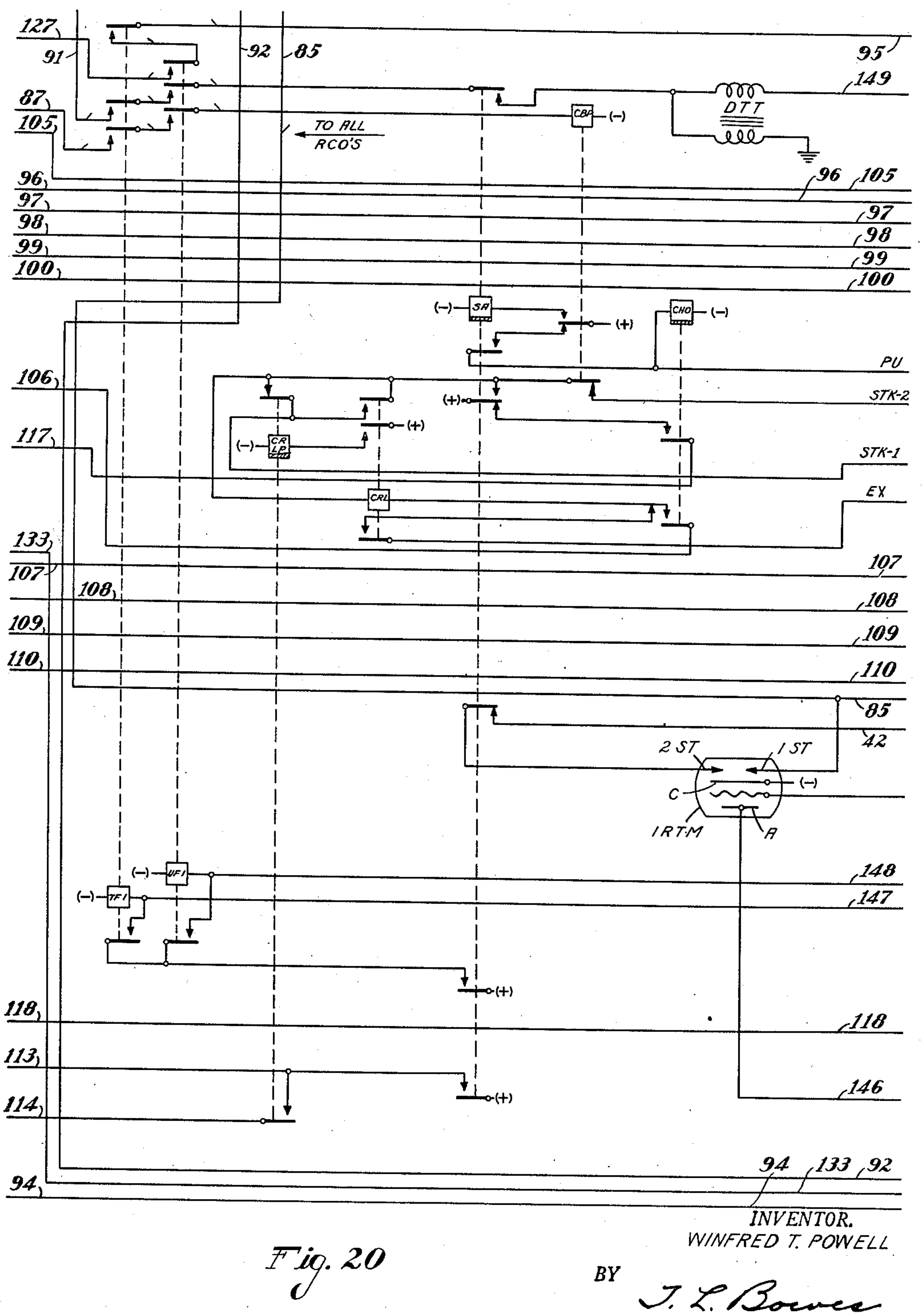
Fig. 20 shows certain control and finder relays of the above mentioned recorder, together with the associated recorder tube marker.
Figure 21:
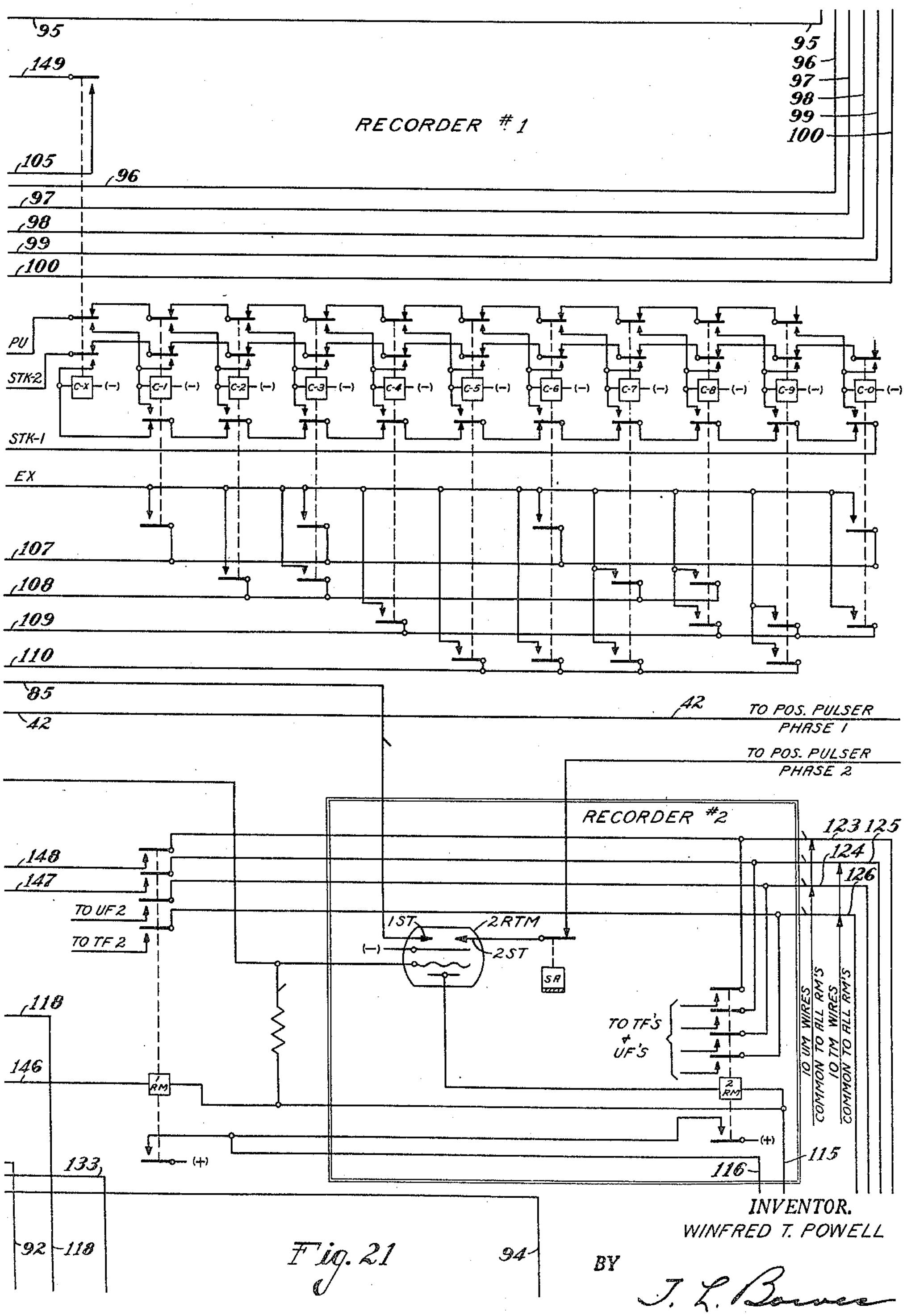
Fig. 21 illustrates the counting relays and the recorder marker relay for the above mentioned recorder, together with a showing of the recorder tube marker and associated recorder marker relay for another recorder.

Dial tone is now connected to the calling line over a circuit extending from the common dial tone conductor (Fig. 19), dial tone condenser, break contact of relay 1TF, conductor 105, make contact of relay CX, conductor 149, and windings of dial tone transformer DTT to ground. The tone from the lower winding of transformer DTT is applied to the calling line by way of a circuit extending through make contact of relay SA, make contact of relay UF1, make contact of relay TF1, conductor 91, break contact of relay BY (Fig. 13), conductor 84, break contact of relay RI, conductor 184, condenser TN, to the terminal of the upper winding of relay CB, which is the tip side of the calling line circuit, as above described.

When the dial at the calling station opens the circuit for the transmission of the first impulse, relays CB and CBP release to close a circuit for operating counting relay C1 which extends from (+), break contact of relay CBP, make contact of relay SA, pick-up conductor PU, make contact of relay CX and winding of relay C1 to (—). Change-over relay CHO is operated over this same circuit and remains operated during the transmission of impulses, releasing a short interval after the termination of the impulse transmission for each digit. At the end of this first impulse, relays CB and CBP operate for releasing counting relay CX because of the open circuit at the break contact of relay CBP.

When relays CB and CBP release at the beginning of the next impulse, a circuit is closed for operating counting relay C2 which extends from (+), break contact of relay CBP, make contact of relay SA, pick-up conductor PU, break contact of relay CX, make contact of relay C1 and winding of relay C2 to (—). At the end of this impulse, relays CB and CBP energize and relay C1 releases because its energizing circuit is open at one break contact of relay CBP and its locking circuit is open at another break contact of relay CBP. Since this is the end of the impulses of the first digit, relay CHO releases because relay CBP remains energized for a comparatively long interval of time. When relay CBP releases to operate a counting relay (C2, for example), the preceding counting relay (C1, for example) is not released because of a locking circuit which extends from (+), make contact of relay SA, break contact of relay CBP, stick conductor STK—2, break contact of relay CX and make contact of relay C1 to the winding of relay C1.

Referring back to the point where relay CHO was operated, a circuit is closed for operating counter release relay CRL which extends from (+), make contact of relay SA, winding of relay CRL, make contact of the continuity spring of relay CHO, conductor 106, break contact of transfer relay 4TF and resistor 25RS to (—). Relay CRL closes an obvious circuit for operating its repeater relay CRLP.

When relay CHO releases, a circuit is closed for operating the relay or relays of the hundreds recorder, which, in this example, is relay B, because #2 was dialed, the circuit extending from (+), make contact of relay SA, winding of relay CRL, break contact of the continuity spring of relay CHO, make contact of relay CRL, executing conductor EX, make contact of relay C2, conductor 108, break contact of transfer relay 1TF and winding of relay B to (—). Relay B closes a locking circuit for itself extending from (+), make contact of relay SA, make contact of relay CRLP, conductor 114, break contact of relay 1TF, make contact and winding of relay B to (—). Since this latter circuit for locking relay B places (+) potential on the right-hand side of counting release relay CRL (by way of conductors 108 and EX), and since relay SA, at another make contact, places (+) potential on the left-hand side of the winding of relay CRL, this relay is short-circuited and released for in turn effecting the release of relay CRLP. With relay CRL released and before relay CRLP releases, (+) is removed from the conductor extending by way of conductor STK—1 and back contacts in series of counting relays C0 to C3, inclusive, and a make contact of relay C2, for opening up the locking circuit and releasing relay C2. Now when relay CRLP releases, (+) potential is again placed on this circuit for again operating relay CX for preparing the counting relays for the next digit. The release of relay CRLP also opens up the above described circuit by way of conductor 114, which locks relay B of the hundreds recorder (or register), but this relay is now locked up over a circuit extending from (+), make contact of relay SA, conductor 113, winding of relay 1TF, make contact and winding of relay B to (−). Since this circuit includes the winding of relay 1TF, this latter relay is operated for transferring the recorder selecting conductors 107 to 110, inclusive from the hundreds recorder to the tens recorder.

When relays CB and CBP release at the beginning of the impulse of the second digit, relays C1 and CHO are operated as previously described, for effecting the operations of relays CRL and CRLP. At the end of this second digit (assumed to be one impulse in this example) relays CB and CBP remain energized for a sufficiently long interval to effect the release of relay CHO. Relay CX is released after this first impulse is transmitted and when relay CHO releases, relay A of the tens recorder (or register) is operated over a circuit extending from (+), make contact of relay SA, winding of relay CRL, break contact of relay CHO, make contact of relay CRL, conductor EX, make contact of relay C1, conductor 107, make contact of relay 1TF, break contact of relay 2TF and winding of relay A to (−). Relay A closes a locking circuit for itself extending from (+) by way of a make contact of relay CRLP, conductor 114, make contact of relay 1TF, break contact of relay 2TF, make contact of relay A and the winding of relay A to (−). At the termination of this digit, relay C1 is released and relays CRL and CRLP release, as previously described, for again operating relay CX to prepare the counting relays for the next digit and for also operating relay 2TF in a circuit similar to that previously described for the operation of relay 1TF.

It was assumed that three impulses are transmitted for the third or units digit, which are effective to intermittently operate relays CB and CBP for operating the counting relays in a manner which will now be obvious from the above explanation. The complete operation of the counting relays is disclosed in connection with Fig. 6 of Powell Patent 2,325,877. Relays CHO, CRL and CRLP are operated at the beginning of the impulse series and are released at the end of the series, with counting relay C3 remaining operated until the units register relays are operated, after which the counting relays are restored to normal and relay 3TF is operated for transferring the control circuits to the next recorder. Since #3 was dialed for the units digit, units recorder relays A and B will be operated. Relay A of the units recorder is operated over a circuit extending from (+), make contact of relay SA, winding of relay CRL, break contact of relay CHO, make contact of relay CRL, conductor EX, make contact of relay C3, conductor 107, make contacts of transfer relays 1TF and 2TF, break contact of relay 3TF, conductor 150 and winding of relay A to (−). Relay B of the units recorder is operated over a similar circuit but extending through the other make contact of relay C3 to conductor 108 and thence through make contacts of relays 1TF and 2TF and a break contart of relay 3TF, conductor 151 to relay B. Relays A and B close locking circuits for themselves extending by way of conductor 114 and make contact of relay CRLP to (+) at a make contact of relay SA. This locking circuit is effected to short-circuit and release relay CRL in the manner previously described for effecting the release of relay CRLP, after which relay 3TF is operated all in the previously described manner.

Relay CX is now operated to again prepare the counting relays for the next or stations digit. Assuming that this digit comprises one impulse, the release of relays CB and CBP effect the operation of relays C1, CHO, CRL and CRLP. At the end of this digit, relays CB and CBP remain operated for effecting the release of relays CX, CHO, CRL and CRLP. The release of relay CHO operates relay A over the previously described circuit, which now extends by way of conductor 107 and make contacts of relays 1TF, 2TF and 3TF, break contact of relay 4TF, conductor 152 and winding of relay A to (−). Relay A closes an obvious locking circuit for itself which is effective to release relays CRL and CRLP and relay C1 is released during the interval between the release of relay CRL and CRLP. Relay CX is again operated but, since there are no additional digits to be transmitted, the preparation of the counting relay circuit for another digit is of no effect at this time. Relay 4TF is operated when relay CRLP releases for inserting the winding of relay 4TF in the locking circuit of relay A of the station register.

Since the hundreds, tens, units and stations digits have now been dialed, it is now in order to cause the called line to be connected to the same link to which the calling line is connected and to cause the stations digit recording to be transferred to the stations relays of the link for applying the proper ringing current to the called line as selected by the dialing of the stations digit.

*Terminating marker operation*

It now becomes necessary to translate the digits recorded on the various recorders back to the decimal system for selecting any one out of 10 hundreds groups, any one out of 10 tens groups and any one out of 10 units groups, together with transferring the station recording to the station relays of the link. This is accomplished by an executing circuit which permits the association of one and only one recorder with a common marking circuit at any one time.

In this example, the operation of relay 4TF records the fact that the last digit has been dialed and closes a circuit from (−), resistor 25RS and conductor 128 to all of the start electrodes of the terminating test marker tubes 1TTM and 2TTM, up to and including 25TTM, the last 23 tubes of this group not being shown. It is understood that there is one of these tubes for each recorder and it is assumed that there are 25 recorders. This (−) circuit is established to start electrode 1ST of tube 1TTM, as well as to corresponding start electrodes of all other tubes of this group. The #2 start electrode 2ST of tube 1TTM is connected to the #1 phase of the positive pulser and corresponding start electrodes of the other tubes 2TTM to 25TTM, inclusive, are individually connected to the #2 to 25 phases of the positive pulser. This connection of each tube to a separate phase of the positive pulser determines that only one tube of the group can be fired at any one time. In the present example, tube 1TTM will be fired at phase #1 if no other tube of the group is energized at this same instant. The reason for this is that the firing of any tube of the group locks out all other tubes of the group because of the multiple screen grid lock-out arrangement, similar to other lock-out circuits as previously described.

The firing of tube 1TTM at phase #1 of the positive pulser is an indication that recorder #1 is to be selected. Executing relay 1EX is operated in the anode-cathode circuit of tube 1TTM, the circuit extending from (+), break contact of release relay EXRL, conductor 133, winding of relay 1EX, conductor 129 and anode-cathode elements of tube ITTM to (—). It will be obvious that a similar circuit would operate relay 2EX if tube 2TTM had been fired to mark recorder #2 as the one to be selected. Similarly, other recorders are selected in accordance with the particular one of these TTM tubes which is fired. The operation of relay 1EX marks recorder #1 as being the one to make the called line test.

Referring back to the point where relay 3TF was operated to mark the recording of the third digit, a circuit is closed for operating busy test relay BT which extends from (+), break contact of relay 1EX, conductor 153, make contact of relay 3TF, conductor 154 and winding of relay BT to (—). Now when relay 1EX operates, as above explained, this circuit is opened and relay BT releases after a measured time interval.

Relay 1EX closes an obvious circuit for operating its repeater relay 1EXP. Relay 1EXP connects (+) by way of conductor 155, through the contacts of the various recorder relays to the common leads leading to the terminating marker relays. Since only one EX relay and one EXP relay can be operated at any one time, a selection is made of the hundreds, tens and units common marking relays in accordance with the number recorded by the recorder which is in its executing condition.

In the present example, relays 2H, 1T and 3U of the terminating marker will be operated because #213 was dialed for the hundreds, tens and units digits. The circuit for operating relay 2H may be traced from (+), make contact of relay 1EXP, conductor 155, break contact of relay A of the hundreds register, make contact of relay B of the hundreds register, break contacts of relays C and D of the hundreds register, conductor 2H and winding of relay 2H to (—). The circuit for operating relay 1T may be traced from (+), make contact of relay 1EXP, conductor 156, make contact of relay A of the tens register, break contacts of relays B, C and D of the tens register, conductor 1T and winding of relay 1T to (—). The circuit for operating relay 3U may be traced from (+), make contact of relay 1EXP, conductor 157, make contact of relay A of the units register, make contact of relay B of the units register, conductor 3U and winding of relay 3U to (—).

The station relays of the link connected to the recorder are operated over circuits leading through contacts of relay 1EXP and relay 11RTF, it being understood that only one EXP relay and only one RTF relay can be operated at any one time. The circuit for operating relay 11RTF may be traced from (+), make contact of relay 1EXP, conductor 127, make contacts of the finder relays UF1 and TF1, conductor 95 and winding of relay 11RTF to (—). The busy relay circuit of the link is likewise extended through contacts of relays 1EXP and 11RTF and is operated or not in accordance with the operated or released condition of relay BY of the recorder.

In the event that the called line is busy (line #213), ground on the sleeve conductor S213 of this line will be extended through make contacts of relays 3U, 1T, 2H, conductor 135 and contacts of 1EX, BT and BY to the winding of relay BY for operating this relay. Relay BY closes a locking circuit for itself to (+) at a make contact of relay 1EX.

The operation of relay BY applies (+) to conductor 100 by way of a make contact of relay 1EXP for operating relay BY of the link by way of a make contact of relay 11RTF. Relay BY of the link closes a locking circuit for itself to (+) at a make contact of relay SAP, by way of conductor 88. The operation of relay BY of the link connects busy tone to the calling line by way of a make contact of relay BY, conductor 84, break contact of ringing relay RI, conductor 84, condenser TN and conductor 72 which extends to the tip side of the calling line. Relay BY is locked in its operated position until the calling party hangs up and opens up the above described locking circuit.

When relay BY in the link is operated, the circuit of relay CBP of the recorder, including conductors 86 and 87, is opened at a break contact of relay BY for effecting the release of relay CBP, which in turn effects the release of relay SA of the recorder.

The release of relay SA opens up the locking circuits of the link finder relays which were operated for effecting the release of these relays. The release of relay SA also removes positive potential from the counting relay circuit of the recorder for restoring any of these relays which were left operated in response to the last digit. This also effects the release of relay CHO which would be operated (but which performs no function) by the release of relay CBP.

Relay SA also opens up the above described locking circuits for the hundreds, tens, units and transfer relays of the recorder.

Relay EXRL is operated when relay SA of the recorder releases and before relay CHO releases, over a circuit extending from (+), break contact of relay SA, make contact of relay CHO, conductor 117, make contact and winding of relay 1EXP, conductor 118 and winding of relay EXRL to (—). This circuit locks relay 1EXP and operates relay EXRL. The operation of relay EXRL removes (+) from conductor 133 which opens up the anode-cathode circuit of tube 1TTM for quenching this tube and for releasing relay 1EX. The release of relay 1EX opens up and releases relay BY of the recorder. The release of relay CHO of the recorder effects the release of relays 1EXP and EXRL by opening up conductor 117.

The release of the finder relays TF1 and UF1 opens up conductor 95 which releases relay 11RTF, this circuit being further opened by the release of relay 1EXP. The operated marker relays 2H, 1T and 3U are released by the release of the relays of the hundreds, tens and units recorders which clears the 10 hundreds, 10 tens and 10 units wires from (+) on conductors 155, 156 and 157.

If the called line is idle, relay BY of the recorder will not operate and then shortly after the operation of relay 1EX, relay BT will be released and, because relay BY is not operated, ground is connected to the sleeve conductor of the called line for operating the cut-off relay of this line and making it busy. This circuit may be traced from (+), break contact of relay BY, break contact of relay BT, make contact of relay 1EX, conductor 135, make contact of relay 2H, make contact of relay 1T and make contact of relay 3U to conductor S213 which leads to the sleeve of the called line.

It will thus be seen that the test of the called line is made by the recorder, and if the line is busy the busy relay in the recorder operates, operating in turn the busy relay of the link to provide busy tone to the calling line, after which the recorder is discharged, thus not holding up the common recorder equipment while the calling party is listening to the busy tone. It will also be noted that no station selecting relay in the link is operated on a busy call because the BY relay of the recorder opens up the circuit to (+) at contact 158, which sets the station relays in the link by way of conductors 96, 97, 98 and 99. Furthermore, it will be understood that the H relays can have contacts provided for controlling the time release feature in the event that the clearing out operation is not effected within a predetermined time after the start of the marking operation on a terminating call. This circuit arrangement may be provided in a similar manner as the time release clear-out feature above described in connection with time release condenser RCD and time release relay TMRR (of Fig. 4).

Assuming that the called line is idle, it will now be explained how the circuits function for connecting the link to the idle called line. With executing relay 1EX of the recorder operated, and with lock-out relay LO in its de-energized condition (because no originating call is being marked at this instant), a circuit is closed for operating terminating lock-out relay TLO. This circuit extends from (+), make contact of relay 1EX, break contact of relay BT, break contact of relay BY, conductor 12, break contact of relay 3TLOP, break contact of relay LO and winding of relay TLO to (−).

The operation of relay TLO closes an obvious circuit for operating its repeater relay 1TLOP, this relay in turn closes an obvious circuit for operating its repeater relay 2TLOP and this relay in turn closes an obvious circuit for operating its repeater relay 3TLOP.

With relays TLO and 2TLOP operated, the circuit of relay LO is opened for a purpose which has been previously described. This open circuit of the LO relay also opens up the anode circuits of all HNTM tubes for preventing the firing of any of these tubes at this time. This, in turn, prevents the firing of any HNTMP tube and the consequent operation of any HM relay at this time. This arrangement enables an originating call to be marked, as previously described, after which a short interval is provided to allow a terminating call to be marked, as just described, with originating and terminating calls alternating when simultaneous calls are recorded.

The operation of relay 1TLOP switches start electrode 2ST of matching tube MTT from the previously described testing circuits for the primary outgoing trunks to the testing circuits for the primary incoming trunks, which include the primary incoming trunk tubes 1PITT, 2PITT (up to and including 10PITT, not shown). The cut-off relay of the called line is operated by the release of relay BT of the recorder, over a circuit extending from (+), break contacts of relays BY and BT in series, make contact of relay 1EX, conductor 135, make contacts in series of relays 2H, 1T and 3U, sleeve conductor S213 of called line #213 and winding of the cut-off relay (not shown) of the called line to (−).

Recalling that terminating marker relays 2H, 1T and 3U were operated, the two-way trunks for connecting the PITT tubes in circuits are now completed in the same manner as previously explained in connection with the HM relays, except that the test is made dependent on relay 1TLOP being operated, thus preventing interference with an originating call, which may be in progress while the marking relays are operated, but while relay 1TLOP is not operated. Consequently, in the present example, tube 1PITT will be fired by the #1 phase of the positive pulser because the #1 trunk in group #2 is idle and no ground is applied to the point between resistors 26RS and 27RS to the #2 start electrode of tube 1PTTT. This circuit for firing tube 1PTTT extends from the positive terminal of the direct current source, make contact of relay 1TLOP, make contact of relay 2H, conductor 30, resistors 26RS and 27RS to the #2 start electrode 2ST of tube 1PTTT. The firing of this tube marks two-way trunk #1 in group #2 as being idle. If trunk #1 in this group is busy and trunk #2 is idle, then tube 2PTTT is fired at phase #2, etc.

The #1 primary incoming test tube 1PITT is now fired because positive battery is applied to its #1 start electrode 1ST over a circuit including a make contact of relay 11RTF. This is because it is assumed that there is no ground potential on the point between the two resistors 28RS and 29RS (conductor 63) associated with this tube, since it is assumed that the #1 incoming primary trunk in the #1 group is idle. If the #1 primary incoming trunk in the #1 group is busy and trunk #1 in group #2 is idle, then tube 2PITT takes over at phase #2 and tube 2PTTT takes over at phase #2 to mark the #2 two-way trunk as being idle.

The circuit for applying the positive potential to start electrode 1ST of tube 1PITT may be traced from the positive terminal of the direct current source, make contact of relay 1TLOP, conductor 101, make contact of relay 11RTF, conductor 103 and resistors 28RS and 29RS to start electrode 1ST of tube 1PITT.

It should be pointed out at this time than any link having #1 for its units digit (link #11, 21, up to and including 01), having its associated RTF relay operated at the time that the #1 phase of the positive pulser is applied and with primary incoming trunk in group #1 being idle, will fire tube 1PITT. If trunk #1 in group #1 is busy and trunk #1 in group #2 is idle, then tube 2PITT takes over at phase #2 and tube 2PTTT takes over at phase #2 to mark the two-way trunk #2 in this group as being idle.

Matching tube MTT is again brought into service for providing the matching test (as described in connection with an originating call), but in this case it fires when the PTTT tube marks the idle two-way trunk and when the PITT tube marks the idle primary incoming trunk having access thereto. The circuit, in this example, for firing tube MTT is effective when current flows in resistor 10RS connected in the cathode circuit of the PTTT tube in the direction of the arrow, which is effective to apply a positive potential to start electrode 1ST of tube MTT by way of conductor 142 at the same time that a potential is applied to the #1 start electrode of tube MTT by way of a make contact of relay 1TLOP and conductors 23 and 22.

When tube MTT fires, it applies a positive potential to the #1ST start electrode of all PTR tubes and the particular one of these tubes will be fired in accordance with the phase at which tube MTT is fired. In this example, tube MTT is fired at phase #1, consequently tube 1PTR will be fired at this same instant and relay 1SGM will be operated in the output circuit of this tube over a circuit extending from (+), make contact of relay 1TLOP, conductor 19, winding of relay 1SGM, conductor 140 and anode-cathode circuit of the tube 1PTR to (−). It will thus be seen that if tube MTT fires at phase #1, tube 1PTR fires at this instant to mark and register the fact that primary incoming trunk #1 in group #1 is chosen. If primary trunk #1 in group #2 is chosen (tube MTT firing at phase #2) then tube 2PTR takes over. The operation of any PTR tube locks out all other tubes in the group because of the multiple screen grid connection, which is accomplished in the previously described manner.

Referring back to the time when relay BT of the recorder is released (with relay BY de-energized because the called line is idle), a circuit is closed for operating station relay A of the link which extends from (+), break contacts of relays BY and BT in series, make contact of relay 1EX, make contact of relay A of the station register of the recorder, make contact of relay 1EXP, conductor 96, and make contact of relay 11RTF to the winding of relay A of the link. Relay A closes a locking circuit for itself extending from (+), make contact of relay SAP, conductor 88, make contact and winding of relay A to (−). It will be noted that the station relay of the link is operated only when relay BY of the recorder is in its de-energized position, as an indication that the called line is idle.

A circuit is now closed for operating secondary incoming trunk connecting relay 1—1 x 1—1 (Fig. 6) which extends from (+), make contact of relay 1TLOP, conductor 36, make contact of relay 11RTF, conductor 58, make contact of relay 1SGM and winding of relay 1—1 x 1—1 to (−). A circuit is now closed for operating primary incoming trunk connector relay 2—1 x 1—1, which extends from (+), make contact of relay 1TLOP, conductor 35, make contact of relay 11RTF, conductor 59, make contact of secondary incoming trunk connecting relay 1—1 x 1—1, conductor 61, make contact of relay 2H, conductor 161 and winding of primary incoming trunk connecting relay 2—1 x 1—1 to (−).

The #1 primary incoming trunk in group #1 must test busy because relay 1—1 x 1—1 in vertical row 1 (Fig. 1A) has been operated, as previously described, to render this trunk non-selectable to succeeding calls until cleared out. This make busy circuit extends from (+), break contact of relay CK (Fig. 13), make contact of relay CKP, conductor 104, conductor S (in bracketed conductor 54), conductor S (Fig. 6, bracketed conductor 54), make contact of relay 1—1 x 1—1 and conductor 63 to the point between resistors 28RS and 29RS, which prevents triggering tube 1PITT by its start electrode 1ST.

The #1 two-way trunk in group 2 must test busy because relay 2—1 x 1—1 in vertical row 1 (Fig. 1A) has been operated, as previously described, to render this trunk non-selectable to succeeding calls until cleared out. This make busy circuit extends from (+) on conductor S (Fig. 6, bracketed conductor 54, as just described), make contact of relay 1—1 x 1—1, conductor S (bracketed conductor 53), conductor S of Fig. 16, make contact of relay 2—1 x 1—1, conductor 27 (from Fig. 16 through Figs. 8, 7, 6 and 5), to the point between resistors 26RS and 27RS, which prevents triggering tube 1PTTT by its start electrode 2ST.

This completes the connection between the calling link and the two-way trunk in the selected hundreds group. It now becomes necessary to operate the proper tens and units finder relays associated with this two-way trunk for connecting to the called line. Before describing this operation, a brief explanation of the method of selectively operating the incoming secondary trunk connecting relays and the incoming primary trunk connecting relays will be given.

In the above example, link #11 is to be connected to primary incoming trunk #1 in group #1 by way of incoming secondary trunk connecting relay 1—1 x 1—1 and thence to two-way trunk #1 in group #2 by way of incoming primary trunk connecting relay 2—1 x 1—1. This is because the #2 hundreds was dialed for operating marker relay 2H and because the test of the two-way trunks in group #2 marked #1 as being idle and the test of the #1 primary incoming trunks in all groups to which link #11 has access, marks #1 in group #1 as being idle. Consequently, with recorder trunk finder relay 11RTF operated (only one of which can be operated at any one time), because link #11 is calling and with secondary group marking relay 1SGM operated (only one of which can be operated at any one time), because the matching test showed the #1 two-way trunk in group #2 to be idle and the #1 primary incoming trunk in group #1 to be idle, a circuit is completed through these two relays for operating incoming secondary trunk connecting relay 1—1 x 1—1, as above described.

Figure 14:
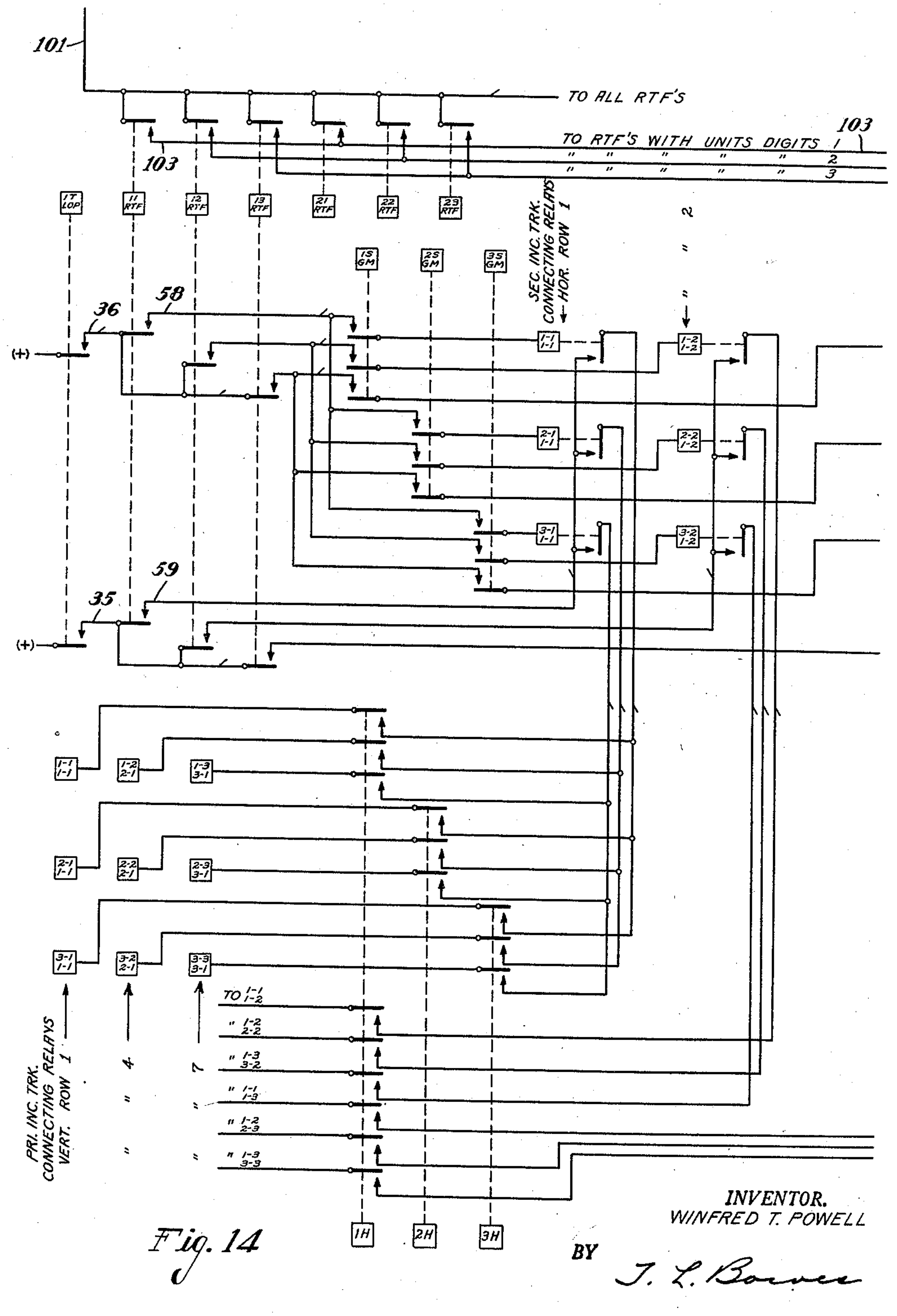
Fig. 14 illustrates the connections for certain hundreds, primary and secondary incoming trunk connecting relays, together with certain co-operating transfer and group marking relays.

If the #2 two-way trunk in the #2 hundreds group is marked idle when link #11 is calling, then the #1 primary incoming trunk in group #2 must also be marked idle (as registered by the operation of relay 2SGM instead of relay 1SGM) for operating incoming secondary trunk connecting relay 2—1 x 1—1, and so on for all the incoming secondary trunk connecting relays in the horizontal row 1 as illustrated in Fig. 14.

If link #12 is calling, the operation of relay 1SGM selects incoming secondary trunk connecting relay 1—2 x 1—2, relay 2SGM selects relay 2—2 x 1—2 and so on for all the incoming secondary trunk connecting relays in the second horizontal row as illustrated in Fig. 14. It will be noted that it makes no difference which hundreds is called for determining the operation of the incoming secondary trunk connecting relays because they function on calls to the various hundreds, the determining factor being that the operated SGM relay shows that the idle marked two-way trunk in the selected hundreds corresponds to the idle marked primary incoming trunk having access to this two-way trunk and the number of the calling link further determines the particular secondary trunk connecting relay to be operated in the horizontal row marked.

The determining factor for the selective operation of the incoming primary trunk connecting relays is the number of the dialed hundreds digit and the horizontal row in which the operated incoming secondary trunk connecting relay is located. In the above example (link #11 calling), incoming secondary trunk connecting relay 1—1 x 1—1 and hundreds relay 2H are operated. A circuit is then completed through contacts of the recorder trunk finder relay 11RTF, conductor 59 (Fig. 14), incoming secondary trunk connecting relay 1—1 x 1—1 and hundreds marking relay 2H to incoming primary trunk connecting relay 2—1 x 1—1. Since this operating circuit comes through a contact of relay 11RTF and since this relay cannot again be operated until this link is calling again, there is no danger of falsely operating another incoming primary trunk connecting relay in the same vertical row when some other H relay operates on a subsequent call. Furthermore, since only one incoming secondary trunk connecting relay in the same vertical row or same horizontal row can be operated at any one time and since only one hundreds marking relay can be operated at any one time, there is no danger of a back-up circuit falsely operating an incoming primary trunk connecting relay. The interconnections between the RTF relays, the incoming secondary trunk connecting relays and the hundreds marker relays for the various combinations are indicated in Fig. 14.

It will now be explained how the finder relays are operated for connecting with the called line, in this example #213. Since incoming secondary trunk connecting relay 1—1 x 1—1 has been operated to connect link #11 to primary incoming trunk #1 in group #1 and since incoming primary trunk connecting relay 2—1 x 1—1 has been operated to extend the connection to the #1 two-way trunk in group #2, it now becomes necessary to operate tens finder relay TF1 and units finder relay UF3 associated with this two-way trunk for extending the connection to called line #213. The circuit for operating relay TF1 of this two-way trunk may be traced from (+), make contact of relay 1TLOP, make contact of relay 2H, conductor 31, make contact of relay 1SGM, make contact of relay 1T, conductor 44, and winding of relay TF1 to (—).

The circuit for operating relay UF3 of this trunk may be traced from (+), make contact of relay 1TLOP, make contact of relay 2H, conductor 32, make contact of relay 1SGM, make contact of relay 3U, conductor 48 and winding of relay UF3 to (—).

It will be noted that certain HM relay contacts (159 and 160) are bridged by contacts (259 and 260) of a corresponding H relay, certain TM relay contacts (162) are bridged by contacts (262) of a corresponding T relay and certain UM relay contacts (164 and 165) are bridged by contacts (264 and 265) of a corresponding U relay. This means that an SGM relay is again operated on a terminating call, the same SGM relay contacts being used on a terminating call to select the circuits for operating the proper TF and UF relays that were used on originating calls, with the further selection being provided by the T and U relays instead of the TM and UM relays, it being understood that no TM nor UM relay will be in operated position when a T or a U relay is operated during a terminating marking test. This is because the circuit to (+) for operating these TF and UF relays on a terminating call comes through make contacts of relay TLOP, this being done to prevent interference during an originating call at which time the relay TLOP is operated to prevent the operation of originating call relays.

The locking circuit for the operated incoming secondary trunk connecting relay may be traced from (+), make contact of relay SAP of the link, conductor 51, make contact and winding of the operated incoming secondary trunk connecting relay (1—1 x 1—1, in this example) to (—). The locking circuit for the operated primary incoming trunk connecting relay (in this example, 2—1 x 1—1) may be traced from (+) on conductor 51, make contact of relay 1—1 x 1—1 of the incoming secondary trunk connecting relay, conductor 50, make contact and winding of the operated incoming primary trunk connecting relay 2—1 x 1—1 to (—). This circuit to (+) is further extended through another make contact of relay 2—1 x 1—1 by way of conductor 65 for closing locking circuits for the operated TF and UF relays of the line finder.

The called end of the link is now extended to the called line by way of the T, R and S conductors (these conductors being bracketed and extended from Fig. 12 to Fig. 6 by conductor 54), through make contacts of incoming secondary trunk connecting relay 1—1 x 1—1, T, R and S conductors (bracketed and extended from Fig. 6 to Fig. 16 by conductor 53), make contacts of incoming primary trunk connecting relay 2—1 x 1—1, conductors 27, 66 and 67, make contacts of finder relay UF3, make contacts of finder relay TF1 to the T, R and S conductors of called line 213. It is now necessary to apply (+) to sleeve conductor S of the called line, disconnect the recorder from the terminating marker, disconnect the calling link from the recorder and ring the called line.

It will be recalled that (+) was applied to the sleeve conductor of the called line (#213 in the present example) when relay BT of the recorder was released and with relay BY being in its deenergized position. When the primary and secondary incoming trunk connecting relays and the finder relays all operate, as above described, to connect the calling link to the called line, the sleeve conductor of the called line will be extended through contacts of these relays back to the calling link.

With any station relay in the link operated (relay A, in the present example), a circuit is closed for operating checking relay CK which extends from (+), make contact of relay A, winding of relay CK and resistor 32RS to (—). Relay CK closes a circuit for operating ringing relay RI extending from (+), make contact of relay CK, conductor 89, winding of relay RI and resistor 33RS to (—). Relay RI closes a locking circuit for itself extending from (+), make contact of relay SAP, conductor 88, make contact and winding of relay RI and resistor 33RS to (—). Relay RI closes a circuit for operating cut-in relay CI extending from (+), make contact of relay SAP, conductor 88, make contact of relay RI and winding of relay CI to (—). Relay CI closes a locking circuit for itself including conductor 88, make contact and winding of relay CI to (—). Relay RI closes a circuit for operating the checking repeater relay CKP extending from (+), make contact of relay RI, conductor 90, back contact and winding of relay CKP to (—). Relay CKP closes a locking circuit for itself, extending from (+) on conductor 88, make contact and winding of relay CKP to (—).

With relays RI and CI operated, with the primary and secondary trunk connecting relays operated and with the finder relays operated, all as above described, ringing current, as selected by the station relays of the link, is applied to the called line. In this example, it being assumed that station relay A is operated, this ringing circuit may be traced from 33 cycle generator (Fig. 13), break contact of relay B, make contact of relay A, conductor 82, winding of trip relay TR, make contacts of ringing relay RI and cut-in relay CI, ring conductor R of Fig. 12 and thence by way of conductor 54 to Fig. 6, conductor R, make contacts of the operated incoming secondary trunk connecting relay 1—1 x 1—1, conductor R and thence by way of conductor 53 to Fig. 16, conductor R, make contact of relay 2—1 x 1—1 of the primary incoming trunk connecting relay, conductor 67, make contacts of the operated finder relays in the 200 line group (UF3 and TF1 of Fig. 8), ring conductor R of the called line through the called substation ringer circuit, tip conductor T of the called line, through the above mentioned operated finder relays in the 200 line group, conductor 66, make contact of primary incoming trunk connecting relay 2—1 x 1—1 of Fig. 16, conductor T and thence by way of conductor 53 from Fig. 16 to Fig. 6, conductor T make contact of relay 1—1 x 1—1 of the secondary incoming trunk connector, conductor T and thence by way of conductor 54 to conductor T of Fig. 12, make contacts of relays CI and RI to Gen. Grd.

Figure 6:
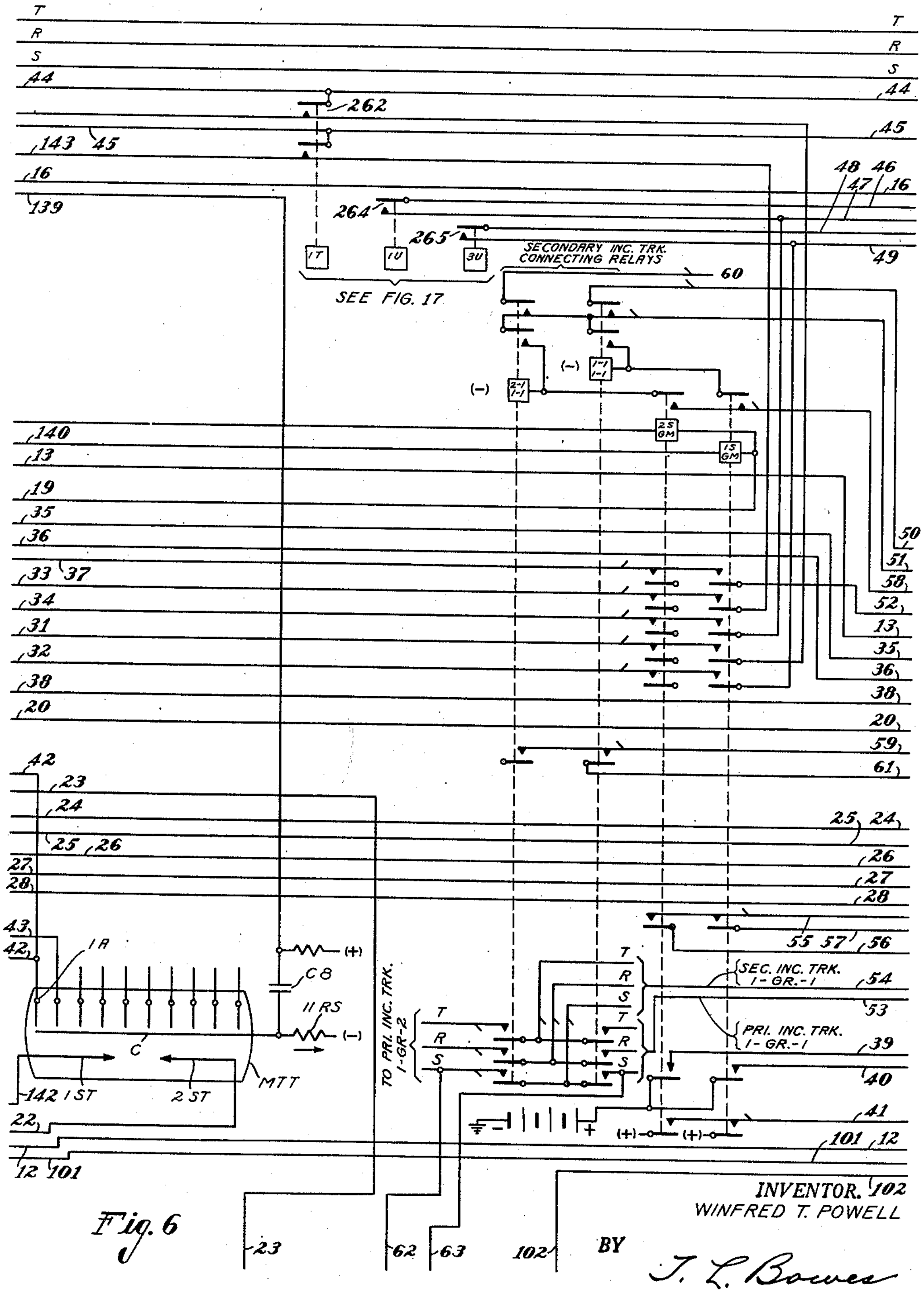
Fig. 6 shows the common matching test tube, together with the connections to certain of the tens, units, secondary incoming trunk and group marking relays.
Figure 7:
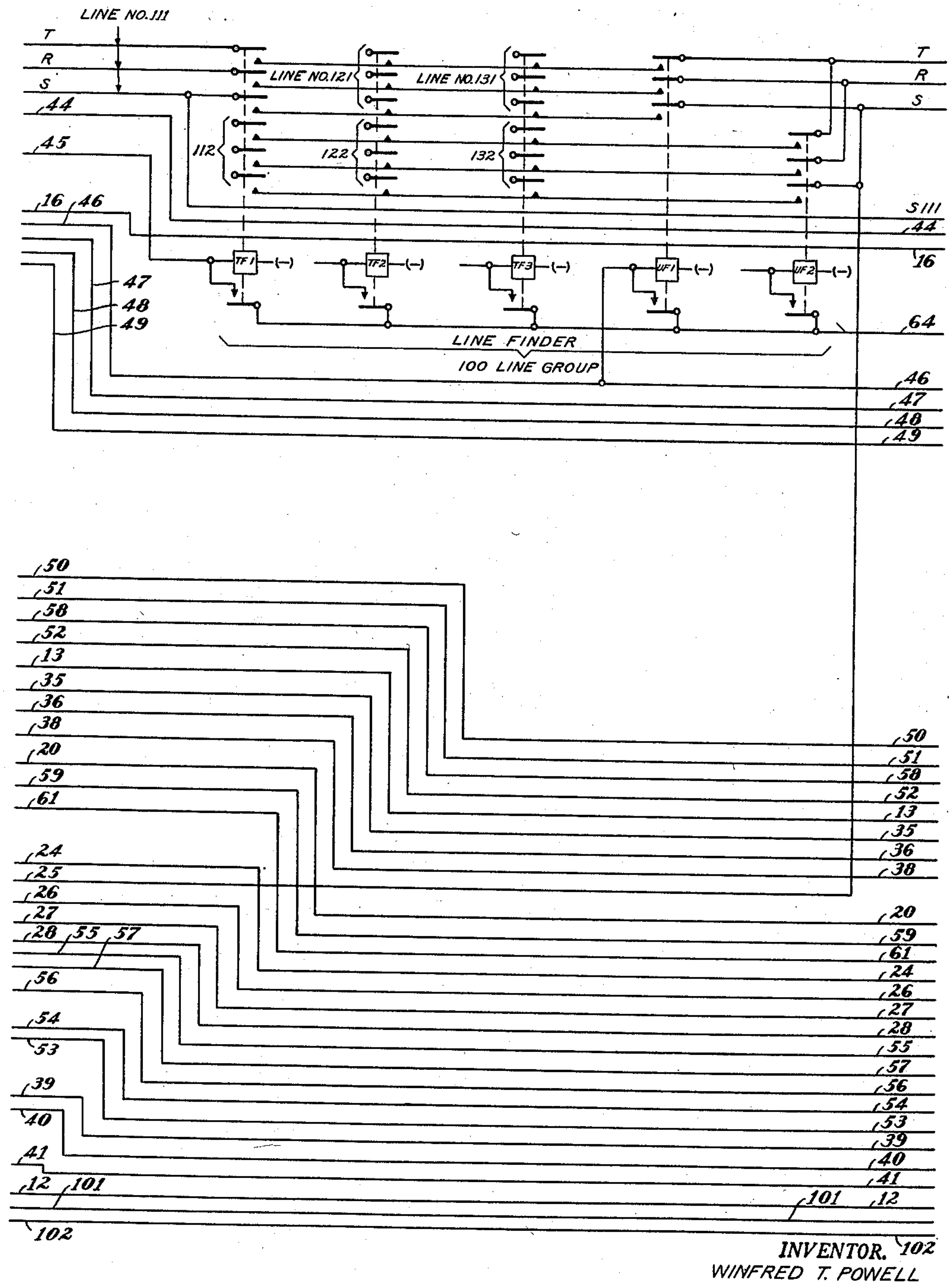
Fig. 7 illustrates a portion of the tens and units relays of a line finder in the 100 line group.
Figure 8:
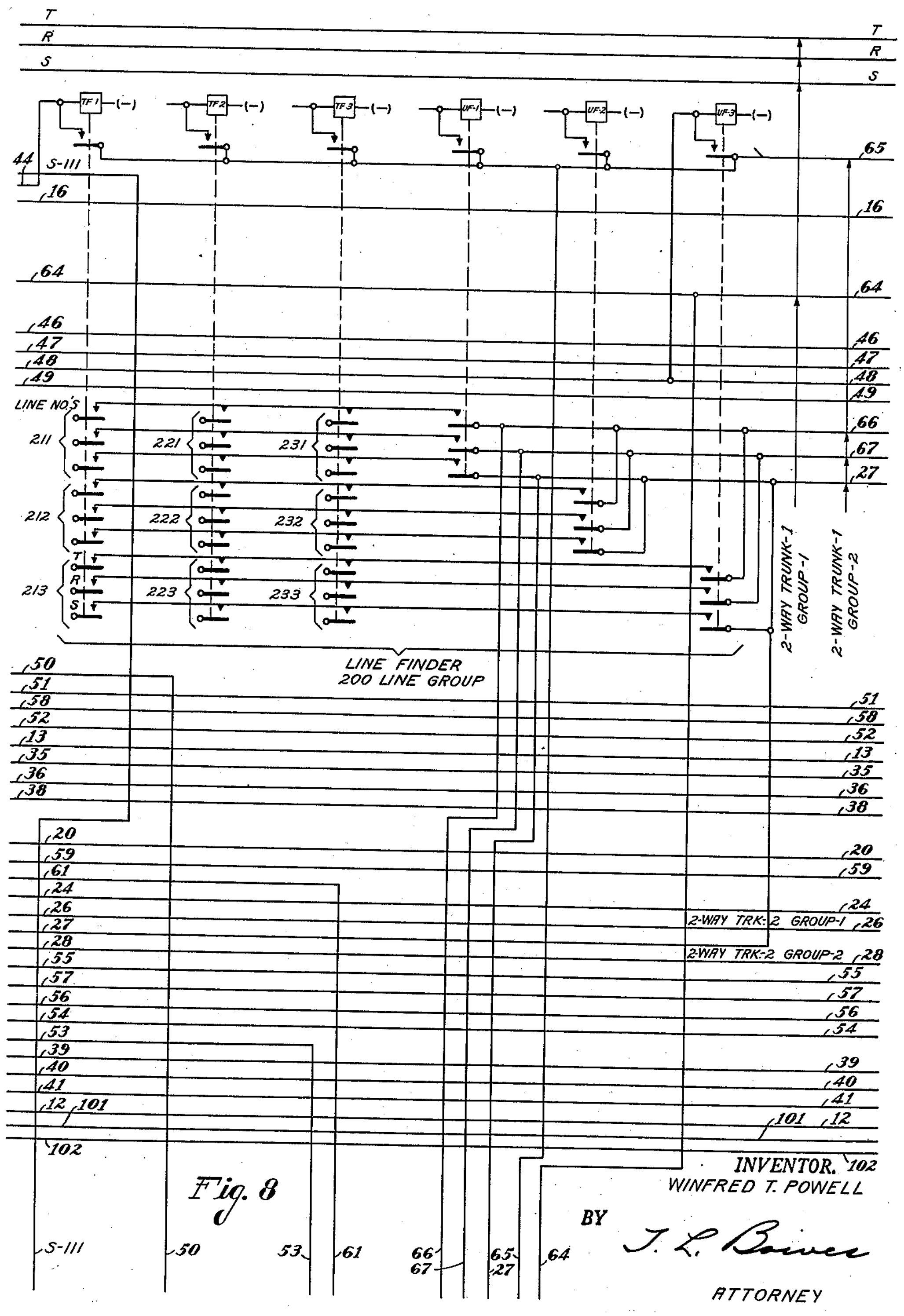
Fig. 8 illustrates a portion of the tens and units relays of a line finder in the 200 line group.
Figure 12:
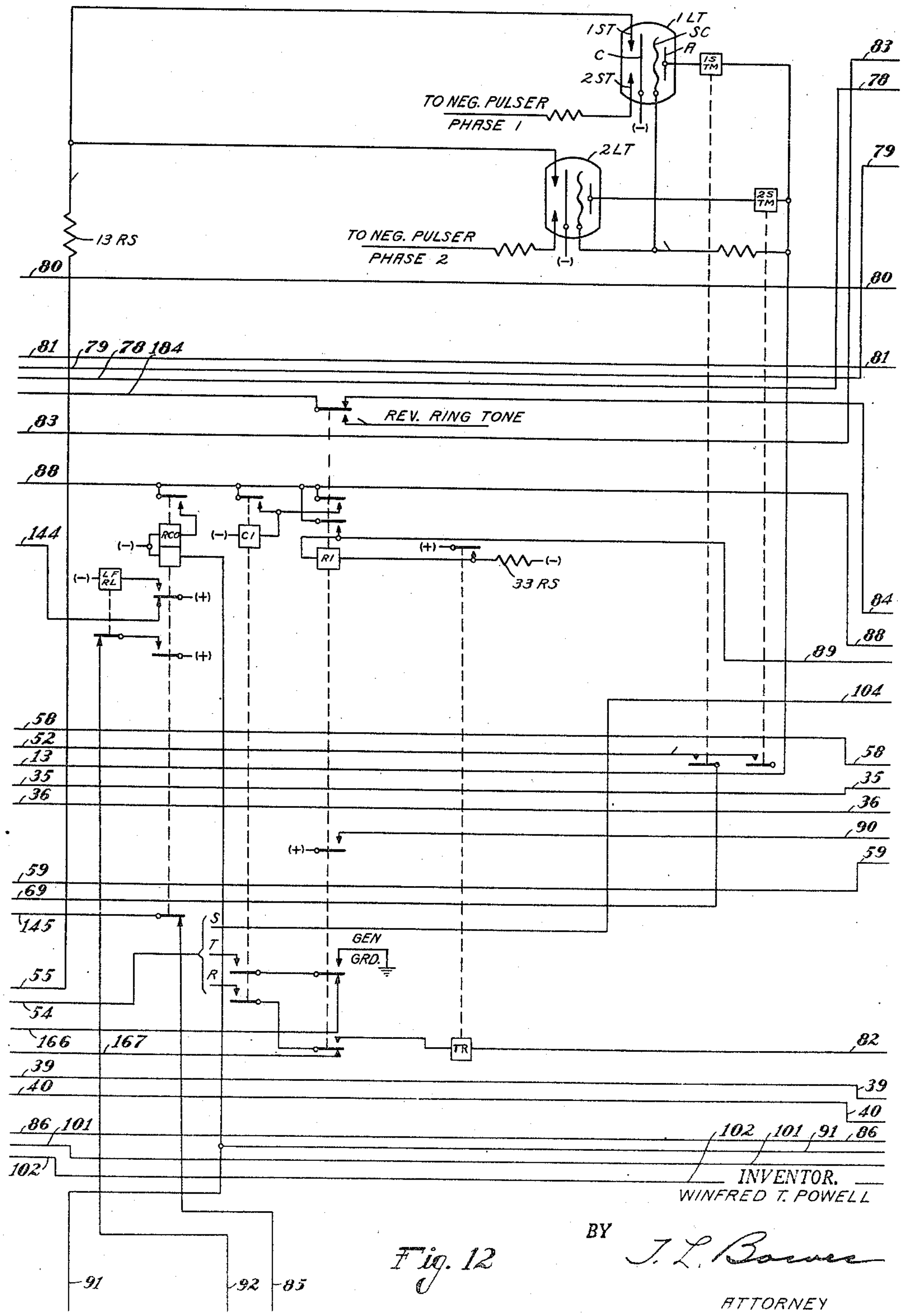
Fig. 12 shows additional relays of one of the links (above mentioned), together with two of the link test tubes.
Figure 16:
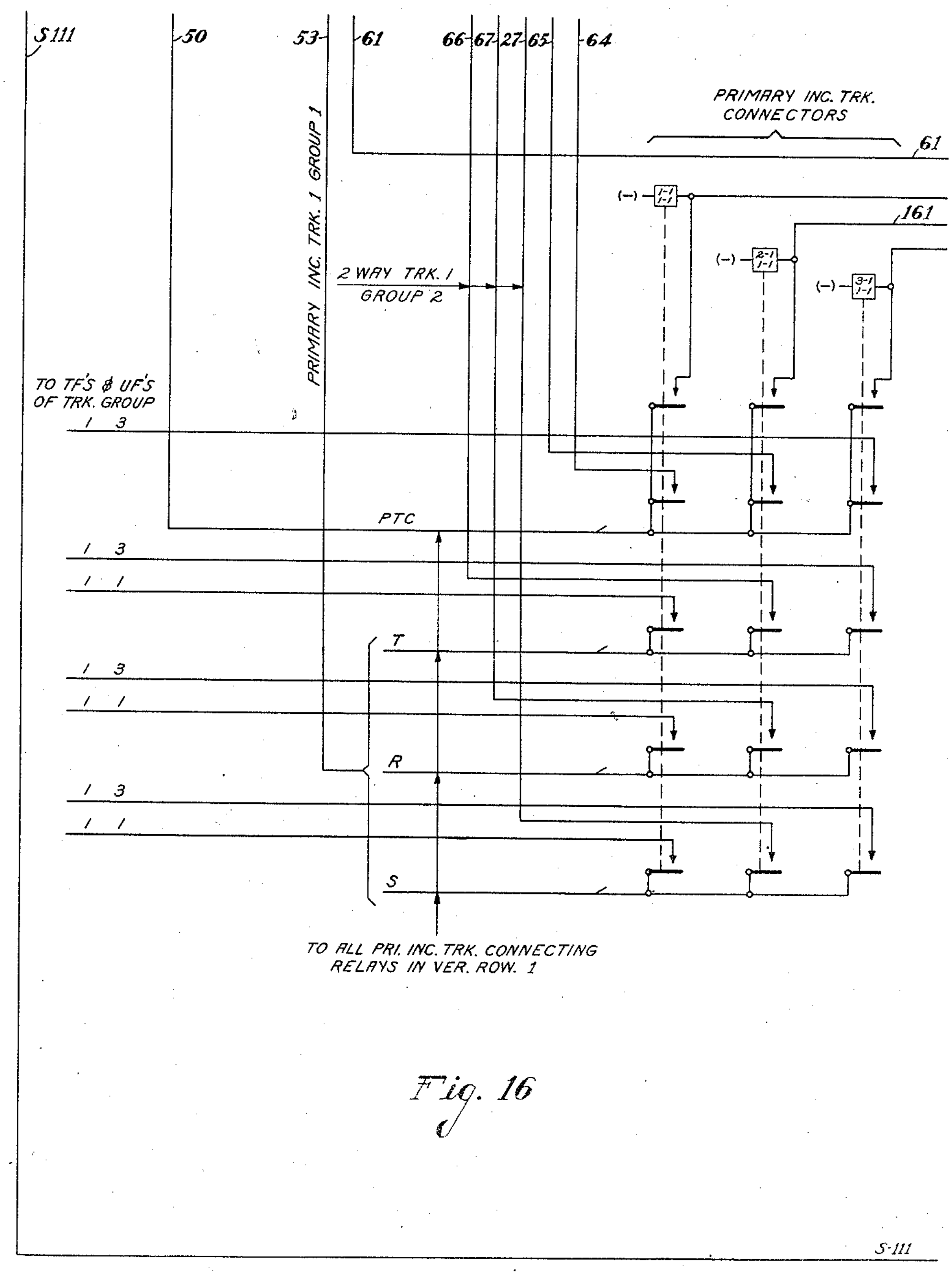
Fig. 16 illustrates a portion of the primary incoming trunk connecting relays.
Figure 17:
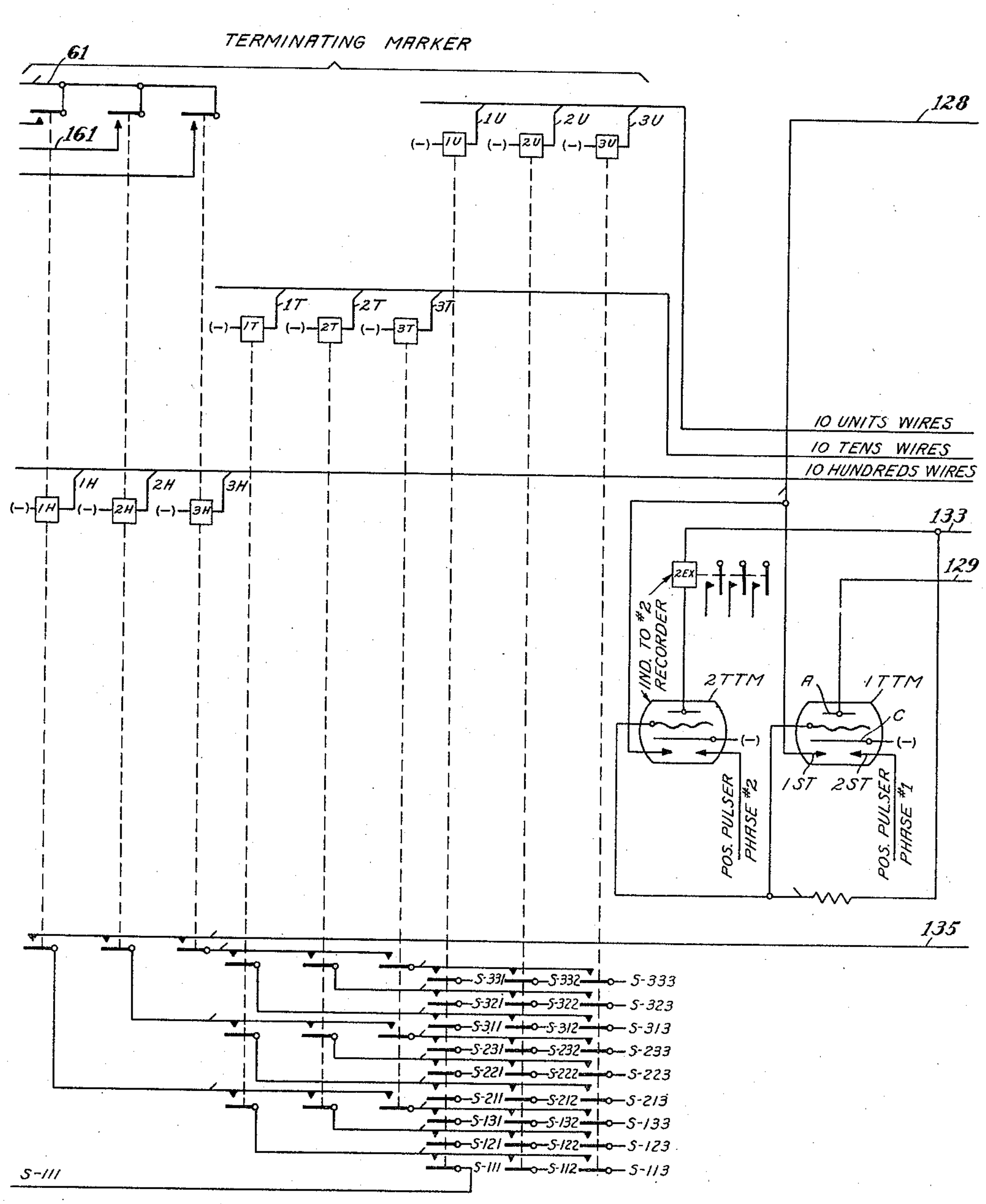
Fig. 17 shows a portion of the terminating marker relays and a portion of the terminating test marker tubes.
Figure 18:
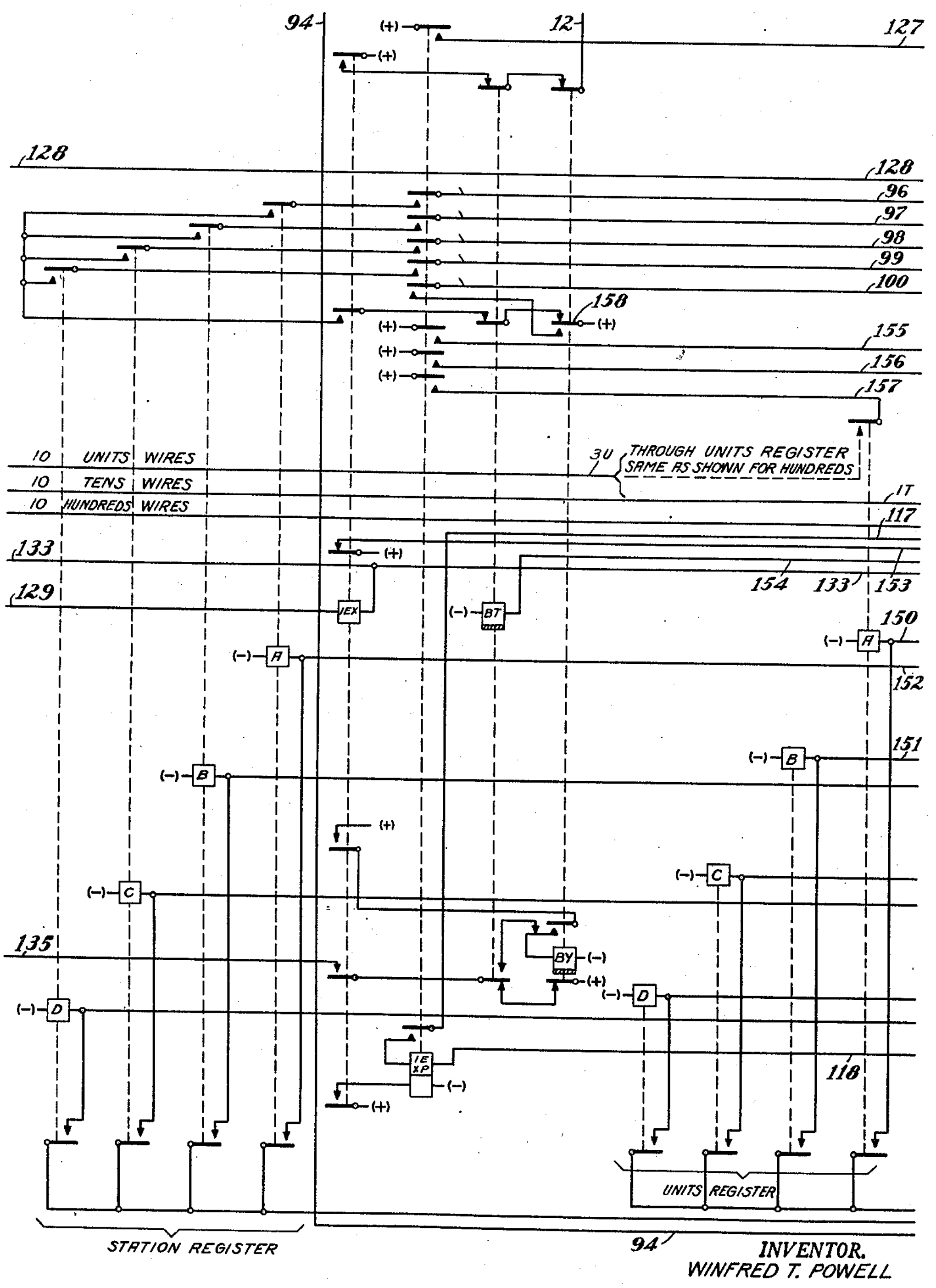
Fig. 18 illustrates certain executing and busy relays, together with the units and stations register relays of one of the recorders.

With relay CKP (Fig. 13) operated, the sleeve conductor S of the called line is extended by way of make contacts of relays TF1 and UF3 (Fig. 8), conductor 27 from Fig. 8 to Fig. 16, make contact of relay 2—1 x 1—1, sleeve conductor S and thence by way of conductor 53 from Fig. 16 to Fig. 6, conductor S, make contact of relay 1—1 x 1—1, conductor S and thence by way of conductor 54 to Fig. 12, conductor S, conductor 104 and make contact of relay CKP to the point between the winding of relay CK and resistor 32RS. The (+) potential applied through contacts of relays BY and BT and conductor 135 of the recorder to the sleeve conductor of the called line (as above described) will be extended back over the above described circuit including sleeve conductor S to the point between resistor 32RS and the winding of relay CK for short-circuiting and releasing relay CK. The release of relay CK closes a circuit from (+), break contact of relay CK and make contact of relay CKP to conductor S of the called line for maintaining this line busy and for maintaining its cut-off relay operated. This circuit from (+) is applied before the circuit from (+) through the break contacts of relays BY and BT of the recorder is opened, when this recorder is released, as will now be described.

With relay CK released and with relay CKP operated and locked, (+) is removed from the circuit including front contact of relay CB by way of conductors 86 and 87 and make contacts of the link finder relays to the winding of relay CBP, effecting the release of relay CBP. The release of relay CBP opens up and releases relay SA and this relay in turn opens up and releases the terminating marker relays, the link finder relays, the counting relays, the recorder relays and the transfer relays. Relay CHO of the recorder is momentarily operated when relay CBP of the recorder releases and closes a circuit from (+), break contact of relay CBP, make contact of relay SA and winding of relay CHO to (−). This same circuit picks up the next counting relay in the chain, but the operation of the counting relay is without function at this time. When relay SA is released, following the release of relay CBP, a circuit is completed through break contact of relay SA, make contact of relay CHO and conductors 117 and 118 for operating relay EXRL in series with the upper winding of relay 1EXP. When relay CHO is released shortly after the release of relay SA, the above described circuit for relays 1EXP and EXRL is opened for releasing these relays. The operation of relay EXRL opens up and quenches tube 1TTM.

Figure 4:
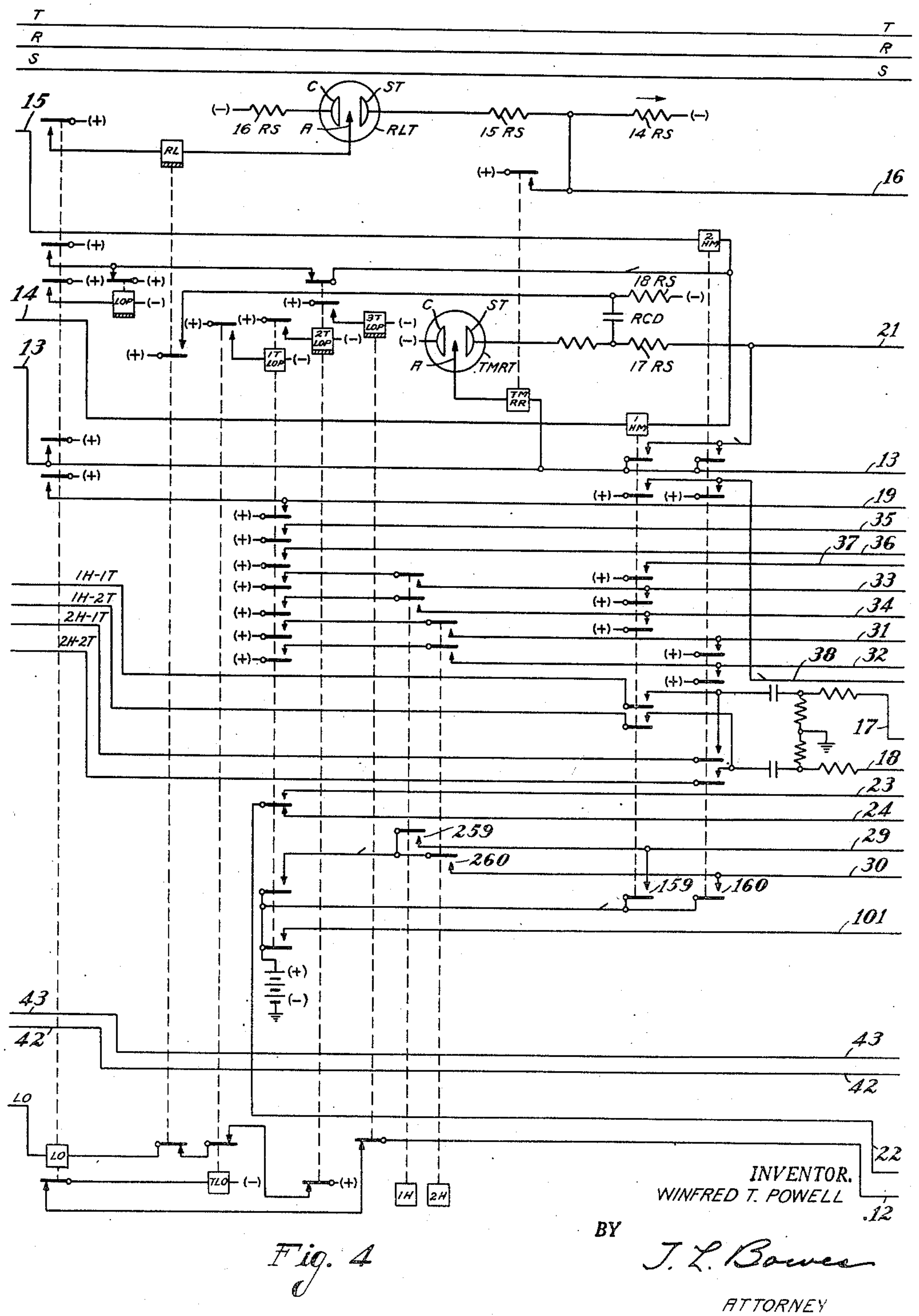
Fig. 4 illustrates certain common lockout and release relays, together with an illustration of certain contact connections for the hundreds marking relays, as well as the release and tens marker release tubes and relays.

When relay 1EX of the recorder releases, relay TLO of Fig. 4 is released because its circuit to (+), including back contacts of relays BY, BT and conductor 12, is opened. The release of relay TLO effects the release of its repeater relays 1TLOP, 2TLOP and 3TLOP. The release of relay 1TLOP opens up the terminating test tube circuits and the release of relay 2TLOP places the circuits in condition to give an originating call a chance to be marked. The release of relay 3TLOP gives a terminating call a chance to be marked. This operation, in combination with the operation of relays LO and LOP, already described, causes the circuits to function for permitting originating and terminating calls to be marked in turn in the event of simultaneous calls of this type. The release of relay 1TLOP removes (+) from conductor 19 which effects the release of relay 1SGM and the quenching of tube 1PTR.

When the called party answers, trip relay TR is operated for short-circuiting and releasing ringing relay RI, which in turn disconnects the called line from the ringing circuit and connects it to the talking circuit, including conductors 166 and 167 and answering bridge relay AB. Relay TR now releases and the conversational circuit between the calling and called lines is completed through the two talking condensers of the link. During the ringing of the called station, reverting ringing tone is applied to the calling line by way of the make contact of relay RI and condenser TN to conductor 72. Relay AB is operated over the called line for supervisory or metering purposes.

The connection is released by the calling party hanging up and opening the circuit of relay CB of the link which effects the release of relays SA and SAP. The release of relay SAP effects the release of station relay A (or any other combination of these relays), relays RCO, CI and CKP of the link. Relay SAP likewise effects the release of the finder relays connecting the calling and called line, as well as the primary and secondary incoming trunk connecting relays and the outgoing primary trunk finder relay. Relay SAP also effects the release of the cutoff relays of the calling and called lines. Relay RCO opens up and releases relay LFRL, thus restoring the circuits to normal.

It will be noted that some of the common relays will require a large number of make contacts, it being understood that it is within the scope of the present invention to provide single contacts on such relays that are operated in the tube circuits, with these contacts operating the relays with the large number of conacts in local circuits.

It will be obvious that numerous modifications may be made in the details of the system herein disclosed. While I have described my invention and the method and means utilized for practicing the same in connection with its specific application to a relay type system, it is to be understood that various other applications and embodiments thereof may be made by those skilled in the art without departing from the spirit of the invention as defined by the appended claims.

What I claim is:

1. In a telephone system, a calling line, a called line, a plurality of two-way trunk circuits, a link, means for connecting said calling line to the originating end of said link by way of a first one of said two-way trunk circuits, means for connecting said called line to the terminating end of said link by way of a second one of said two-way trunk circuits, means for interposing a selecting device between the originating end of said link and said two-way trunks, means for interposing another selecting device between the terminating end of said link and said two-way trunks, whereby said two-way trunks may be used for either originating connections to or terminating connections from said link.

2. In an automatic telephone switching system, a group of lines, links common to said lines, switching equipment, control equipment including an electronic device common to said lines and said links, means responsive to a call originated on a calling one of said lines for operating said electronic device, means responsive to the operation of said electronic device for causing said switching equipment to extend a connection between a calling line and an idle one of said links, digit recording means operable over the calling line to record digit information indicative of the designation of the desired called line, and means for operating said control equipment and said electronic device in accordance with the recorded digit information to cause said switching equipment to extend a connection between said link and the desired called line.

3. In a switching system including a large group of lines divided into small groups, groups of primary switching devices assigned respectively to said small groups of lines, secondary switching devices assigned respectively to said primary switching devices, each of the said primary and secondary switching devices being composed entirely of selectively operable relays, control equipment common to said groups of lines and including an electronic device, means effective in response to the origination of a call on any line in any one of said small groups for causing said common control equipment to mark the identity of the calling line, and means responsive to said marking by said common control equipment for causing an idle one of said primary and secondary switching devices to make connection with the calling line.

4. In a switching system including a plurality of large groups of lines each group being divided into small groups, groups of primary switching devices assigned respectively to said small groups of lines, secondary switching devices assigned respectively to said primary switching devices, each of the said primary and secondary switching devices being composed entirely of selectively operable relays, control equipments common to said large groups of lines each including an electronic device, means effective in response to the origination of a call on any line in any one of said small groups for selecting and causing one of said common control equipments to mark the identity of the calling line, and means responsive to said marking by said selected common control equipment for causing an idle one of said primary and secondary switching devices to make connection with the calling line.

5. In a switching system including a plurality of large groups of lines each group being divided into small groups, groups of primary switching devices assigned respectively to said small groups of lines, secondary switching devices assigned respectively to said primary switching devices, each of the said primary and secondary switching devices being composed entirely of selectively operable relays, control equipments common to said large groups of lines each including an electronic device, means effective in response to the origination of a call on any line in any one of said small groups for selecting and causing one of said common control equipments to mark the identity of the calling line and means responsive to said marking by said selected common control equipment for causing an idle one of said primary switching devices assigned to the calling small group to make connection with the calling line and for causing an idle one of said secondary switching devices to make connection with the last named primary switching device.

6. In a telephone system, subscribers' lines divided into a plurality of line groups, a plurality of relay type line finder groups for serving the lines of said line groups, a gaseous conductor device common to said finder groups, means responsive to the initiation of a call in any line group for effecting the operation of said gaseous conductor device, and means controlled by the operation of said gaseous conductor device for marking the identity of a calling line and for causing one of said line finders to connect to the calling line.

7. In a telephone system, subscribers' lines arranged in a plurality of line groups, relay type line finders arranged in a plurality of finder groups for serving the lines of said line groups, a gaseous conductor device common to said finder groups, means responsive to the initiation of a call in any line group for effecting the operation of said gaseous conductor device at any one of a plurality of time intervals following the initiation of said call, and means controlled by the operation of said gaseous conductor device at a particular one of said time intervals for causing one of said line finders to connect to the calling line the particular one of said line finders being determined by the particular time interval at which said gaseous conductor device is operated.

8. The combination in a selecting system of a plurality of lines having digital designations, a plurality of truck circuits for connecting to selected ones of said lines, a first group of relays associated with each trunk circuit corresponding respectively to the digit characters of a first digital place of the designations, a second group of relays associated with each trunk circuit corresponding respectively to the digit characters of a second digital place of the designations, an electronic device, means for operating said electronic device at any one of a plurality of phases representing trunk circuit designations, means responsive to a call from one of said lines for causing the operation of the particular relay of the group representing the first place digit of said line and for causing the operation of the particular relay of the group representing the second place digit of said line, and means responsive to the operation of said electronic device for determining the particular one of said trunk circuits to be used for connecting to said calling line.

9. The combination in a selecting system of a plurality of lines having digital designations, a plurality of trunk circuits for connecting to selected ones of said lines, a first group of relays associated with each trunk circuit corresponding respectively to the digit characters of a first digital place of the designations, a second group of relays associated with each trunk circuit corresponding respectively to the digit characters of a second digital place of the designations, an electronic device, means for operating said electronic device at any one of a plurality of phases representing trunk circuit designations, means responsive to a call to one of said lines for causing the operation of the particular relay of the group representing the first place digit of said line and for causing the operation of the particular relay of the group representing the second place digit of said line, and means responsive to the operation of said electronic device for determining the particular one of said trunk circuits to be used for connecting to said called line.

10. The combination in a selecting system of a plurality of lines having digital designations, a plurality of trunk circuits for connecting to selected ones of said lines, a first group of relays associated with each trunk circuit corresponding respectively to the digit characters of a first digital place of the designations, a second group of relays associated with each trunk circuit corresponding respectively to the digit characters of a second digital place of the designations, an electronic device, means for operating said electronic device at any one of a plurality of phases representing trunk circuit designations, means responsive to a call to or from one of said lines for causing the operation of the particular relay of the group representing the first place digit of said line and for causing the operation of the particular relay of the group representing the second place digit of said line, and means responsive to the operation of said electronic device for determining the particular one of said trunk circuits to be used for connecting to said calling or said called line.

11. In a telephone system, a plurality of lines, a plurality of links, a plurality of two-way trunks, a plurality of outgoing trunks operatively associated with said links, means for generating a multiplicity of signal pulses of different phases, a first marking means including said generating means for marking each two-way trunk representing its designation, a second marking means including said generating means for marking each outgoing trunk representing its designation, means for initiating a call on one of said lines, and means responsive to the initiation of said call for causing a marked two-way trunk to connect with said one line and for causing a marked outgoing trunk to connect with said marked two-way trunk.

12. In a telephone system, a plurality of lines, a plurality of links, a plurality of two-way trunks, a plurality of outgoing trunks operatively associated with said links, means for generating a multiplicity of signal pulses of different phases, a first marking means including said generating means for marking each two-way trunk representing its designation and its idle condition, a second marking means including said generating means for marking each outgoing trunk representing its designation and its idle condition, means for initiating a call on one of said lines, and means responsive to the initiation of said call for causing a marked two-way trunk to connect with said one line and for causing a marked outgoing trunk to connect with said marked two-way trunk.

13. In a telephone system, a plurality of lines, a plurality of links, a plurality of two-way trunks, a plurality of outgoing trunks and a plurality of incoming trunks operatively associated with said links, means for generating a multiplicity of signal pulses of different phases, a first marking means including said generating means for marking each two-way trunk representing its designation and its idle condition, a second marking means including said generating means for marking each outgoing trunk representing its designation and its idle condition, means for initiating a call on one of said lines, means responsive to the initiation of said call for causing a marked two-way trunk to connect with said one line and for causing a marked outgoing trunk to connect with said marked two-way trunk, and means responsive to a call to another of said lines for causing a marked two-way trunk to connect with said another line and for causing a marked incoming trunk to connect with said marked two-way trunk.

14. In combination, primary finders, secondary finders, lines appearing in said primary finders, trunks appearing in said secondary finders, groups of links, a plurality of relays for said primary finders, a plurality of relays for said secondary finders, a plurality of relays for said links, electronic devices common to said primary and secondary finders, a first marking means including said electronic devices for operating a relay of one of said primary finders and a relay of one of said secondary finders for connecting a calling line to one of said trunks, and a second marking means also responsive to said calling condition for connecting said one trunk to one of said links.

15. In combination; a plurality of relay type finders arranged in groups; groups of lines appearing respectively in said groups of finders; a plurality of links arranged in groups; a plurality of space discharge devices; a source of current for producing potentials of different phases, said phases characterizing respectively the corresponding finder of each group; means including said source responsive to calling lines of each group for applying pulses to said space discharge devices of the phases characterizing the number of the calling line, the number of the finder and the number of the link; means responsive to said pulses for selectively discharging said space discharge devices; means effective when one of said space discharge devices discharges for preventing the discharge of any one of the other space discharge devices; and means including the discharged device for controlling the operation of said finders to connect with calling lines and for connecting the finders with idle links.

16. In a telephone system, a calling line, a link, a recorder, a first switching means for extending a connection from said calling line to said link, a second switching means for extending a connection from said link to said recorder, means associated with said calling line for transmitting digits representing a called line, means in said recorder for recording said digits, a test conductor individual to said called line, common marking means for connecting said recorder to said test conductor to determine the idle or busy condition of said called line, means responsive to the idle condition of said called line for extending said test conductor to said link, and means responsive to the extension of said test conductor to said link for disconnecting said link from said recorder.

17. In a telephone system, a line, a link, a relay switching device comprising a plurality of relays, electronic means for controlling the operation of said relays in various combinations, means for initiating calls from said line, means for extending calls to said line, means responsive to the initiation of a call from said line and including said electronic means for variably operating said relays for connecting said link to said line, and means responsive to a call to said line and including said electronic means for variably operating said relays for connecting said link to said line.

18. In a telephone system, a line, a link, a relay switching device comprising a plurality of relays, electronic means for controlling the operation of said relays in various combinations, means for initiating calls from said line, means for extending calls to said line, means responsive to the initiation of a call from said line and including said electronic means for variably operating said relays for connecting said link to said line, and telephone dial operated means responsive to a call to said line and including said electronic means for variably operating said relays for connecting said link to said line.

19. In a telephone system, a line, a non-numerical switching device for connecting with said line, means for initiating a call from said line and for extending a call to said line, electronic means for marking said line as a calling line and for initiating the operation of said switching device, and means responsive to a call from or a call to said line for operating said electronic means whereby said switching device connects with said line when calling or called.

20. In combination, primary finders, secondary finders, lines appearing in said primary finders, trunks appearing in said secondary finders, groups of links, a plurality of relays for said primary finders, a plurality of relays for said secondary finders, a plurality of relays for said links, common electronic devices, a first marking means including said electronic devices for operating a relay of one of said primary finders and a relay of one of said secondary finders for connecting a calling line to one of said trunks, a second marking means also responsive to said calling condition for connecting said one trunk to one of said links, and means including said first and said second marking means for connecting one of said links to a called line.

21. In combination, primary finders, secondary finders, lines appearing in said primary finders, trunks appearing in said secondary finders, groups of links, a plurality of relays for said primary finders, a plurality of relays for said secondary finders, a plurality of relays for said links, common electronic devices, a first marking means including said electronic devices for operating a relay of one of said primary finders and a relay of one of said secondary finders for connecting a calling line to one of said trunks, a second marking means also responsive to said calling condition for connecting said one trunk to one of said links, means including said first and said second marking means for connecting one of said links to a called line, and means operative when a plurality of simultaneous connections are awaiting completion to calling and called lines for alternately completing said connections to calling and called lines one at a time.

22. In combination; a plurality of finders arranged in groups; groups of lines appearing respectively in said groups of finders; a plurality of links arranged in groups; a plurality of space discharge devices; a source of current for producing potentials of different phases, said phases characterizing respectively the corresponding finder of each group; means including said source responsive to calling lines of each group for applying pulses to said space discharge devices of the phases characterizing the number of the calling line, the number of the finder and the number of the link; means responsive to said pulses for selectively discharging said space discharge devices, means effective when one of said space discharge devices discharges for preventing the discharge of any one of the other space discharge devices; and means including the discharged device for controlling the operation of said finders to connect with the calling lines and for connecting the finders with idle links.

23. In a telephone system, a line, a switching device comprising a combination line finder and line connector for connecting with said line, an electronic marker for controlling the operation of said switching device as a line finder or as a line connector, means including said electronic marker in response to the initiation of a call from said line for causing said switching device to find said line as a calling line, and means including said electronic marker responsive to dialled impulses corresponding to said line for causing said switching device to connect to said line as a called line.

24. In a telephone system, a line, a plurality of switching devices each comprising a combination line finder and line connector for connecting with said line, an electronic marker common to said switching devices for controlling the operation of any one of said switching devices as a line finder or as a line connector, means including said electronic marker in response to the initiation of a call from said line for causing any one of said switching devices to find said line as a calling line, and means including said electronic marker responsive to dialled impulses corresponding to said line for causing any one of said switching devices to connect to said line as a called line.

25. In a telephone system, a plurality of lines, a plurality of switching devices common to said lines, an electronic device common to said switching devices, means responsive to a first call initiated from any one of said lines for operating said electronic device, means responsive to a second call directed to any one of said lines for operating said electronic device, and means including the operation of said electronic device in response to said first call or said second call for causing any one of said switching devices to connect with any one of said lines.

26. In a telephone system, a plurality of lines, a plurality of switching devices common to said lines, a plurality of electronic devices common to said switching devices, means responsive to a first call initiated from any one of said lines for selectively operating any one of said electronic devices, means responsive to a second call directed to any one of said lines for selectively operating any one of said electronic devices, and means including an operated electronic device in response to said first call or said second call for causing any one of said switching devices to connect with any one of said lines.

WINFRED T. POWELL.

(References on following page)

REFERENCES CITED

The following references are of record in the file of this patent:

UNITED STATES PATENTS

| Number | Name | Date |
|---|---|---|
| 1,951,134 | Dixon | Mar. 13, 1934 |
| 2,177,079 | Saunders | Oct. 24, 1939 |
| 2,279,531 | Saunders | Apr. 14, 1942 |
| 2,291,752 | Parker | Aug. 4, 1942 |

| Number | Name | Date |
|---|---|---|
| 2,299,203 | Beaumont | Oct. 20, 1942 |
| 2,310,452 | Mecham | Feb. 9, 1943 |
| 2,326,551 | Mohr | Aug. 10, 1943 |
| 2,387,018 | Hartley | Oct. 16, 1945 |
| 2,409,586 | Powell | Oct. 15, 1946 |

OTHER REFERENCES

Automatic Telephony, Smith and Campbell, McGraw-Hill Book Co., 1921.

Certificate of Correction

Patent No. 2,543,534 February 27, 1951

WINFRED T. POWELL

It is hereby certified that error appears in the printed specification of the above numbered patent requiring correction as follows:

Column 22, line 2, for "contart" read *contact*; column 24, line 23, for the reference numeral "84" read *184*;

and that the said Letters Patent should be read as corrected above, so that the same may conform to the record of the case in the Patent Office.

Signed and sealed this 14th day of August, A. D. 1951.

[SEAL]

THOMAS F. MURPHY,
*Assistant Commissioner of Patents.*